(12) United States Patent
Nogami et al.

(10) Patent No.: US 10,085,247 B2
(45) Date of Patent: Sep. 25, 2018

(54) PHYSICAL CONTROL CHANNEL MONITORING

(71) Applicant: SHARP KABUSHIKI KAISHA, Osaka-shi, Osaka (JP)

(72) Inventors: Toshizo Nogami, Osaka (JP); Shoichi Suzuki, Osaka (JP); Kimihiko Imamura, Osaka (JP); Kazuyuki Shimezawa, Osaka (JP); Naoki Kusashima, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/772,575

(22) PCT Filed: Mar. 7, 2014

(86) PCT No.: PCT/JP2014/055914
§ 371 (c)(1),
(2) Date: Sep. 3, 2015

(87) PCT Pub. No.: WO2014/136927
PCT Pub. Date: Sep. 12, 2014

(65) Prior Publication Data
US 2016/0021641 A1    Jan. 21, 2016

(30) Foreign Application Priority Data

Mar. 8, 2013  (JP) .................................. 2013-046171

(51) Int. Cl.
*H04W 72/04* (2009.01)
*H04J 11/00* (2006.01)
(Continued)

(52) U.S. Cl.
CPC ........... *H04W 72/042* (2013.01); *H04J 11/00* (2013.01); *H04J 11/005* (2013.01);
(Continued)

(58) Field of Classification Search
CPC .... H04W 72/042; H04L 5/001; H04J 11/0079
See application file for complete search history.

(56) References Cited

U.S. PATENT DOCUMENTS 9,479,311 B2 * 10/2016 Aiba ..................... H04L 5/0048
9,497,734 B2 * 11/2016 Noh ..................... H04L 5/0051
(Continued)

FOREIGN PATENT DOCUMENTS

| WO | WO 2012/118269 A2 | 9/2012 |
| WO | WO 2012/147601 A1 | 11/2012 |
| WO | WO 2014/020819 A1 | 2/2014 |

OTHER PUBLICATIONS

3GPP TS 36.211 V11.1.0 (Dec. 2012); 3rd Generation Partnership Project; Technical Specification Group Radio Access Network; Evolved Universal Terrestrial Radio Access (E-UTRA); Physical Channels and Modulation (Release 11), pp. 1-108.
(Continued)

*Primary Examiner* — Warner Wong
(74) *Attorney, Agent, or Firm* — Birch, Stewart, Kolasch & Birch, LLP

(57) ABSTRACT

Provided is a terminal that performs communication with a base station, in which, in a case where a physical downlink control channel is monitored in a first enhanced physical downlink control channel-physical resource block set, a demodulation reference signal is used that is based on a scrambling sequence which is initialized by a prescribed parameter, and in which, in a case where the physical downlink control channel is monitored in a second enhanced physical downlink control channel-physical resource block set, a demodulation reference signal is used that is based on a scrambling sequence which is initialized by a parameter that is set individually for each terminal.

6 Claims, 22 Drawing Sheets

(51) Int. Cl.
*H04L 1/00* (2006.01)
*H04L 5/00* (2006.01)
*H04L 1/18* (2006.01)

(52) U.S. Cl.
CPC ............ *H04J 11/0079* (2013.01); *H04L 1/00* (2013.01); *H04L 1/1861* (2013.01); *H04L 5/001* (2013.01); *H04L 5/0048* (2013.01); *H04L 5/0051* (2013.01)

(56) References Cited

U.S. PATENT DOCUMENTS

| | | | |
|---|---|---|---|
| 2012/0281576 A1 | 11/2012 | Yamada et al. | |
| 2013/0058240 A1 | 3/2013 | Kim et al. | |
| 2013/0107809 A1* | 5/2013 | Ko | H04W 72/042 370/328 |
| 2013/0223402 A1* | 8/2013 | Feng | H04L 5/0007 370/330 |
| 2013/0242882 A1* | 9/2013 | Blankenship | H04W 72/042 370/329 |
| 2014/0003349 A1 | 1/2014 | Kang et al. | |
| 2014/0003379 A1 | 1/2014 | Kang et al. | |
| 2014/0016589 A1 | 1/2014 | Kang et al. | |
| 2014/0044088 A1 | 2/2014 | Nogami et al. | |
| 2014/0064205 A1* | 3/2014 | Feng | H04L 5/001 370/329 |
| 2014/0071936 A1* | 3/2014 | Zhang | H04L 25/0226 370/330 |
| 2014/0169565 A1* | 6/2014 | Roman | H04W 12/08 380/270 |
| 2014/0177547 A1* | 6/2014 | Guo | H04W 72/042 370/329 |
| 2014/0211747 A1 | 7/2014 | Takeda et al. | |
| 2014/0301330 A1* | 10/2014 | Lee | H04W 74/0833 370/329 |
| 2014/0307699 A1* | 10/2014 | Sorrentino | H04L 5/0007 370/329 |
| 2014/0362758 A1* | 12/2014 | Lee | H04L 5/0037 370/312 |
| 2014/0376395 A1* | 12/2014 | Kim | H04L 5/001 370/252 |
| 2015/0334683 A1* | 11/2015 | Guo | H04L 5/0035 370/329 |
| 2016/0198496 A1 | 7/2016 | Jeong et al. | |
| 2017/0013612 A1* | 1/2017 | Nayeb Nazar | H04L 1/007 |
| 2017/0171847 A1 | 6/2017 | Papasakellariou et al. | |
| 2017/0311274 A1* | 10/2017 | Yu | H04W 56/001 |
| 2017/0311275 A1* | 10/2017 | Han | H04J 11/0079 |

OTHER PUBLICATIONS

3GPP TS 36.213 V11.1.0 (Dec. 2012); 3rd Generation Partnership Project; Technical Specification Group Radio Access Network; Evolved Universal Terrestrial Radio Access (E-UTRA); Physical layer procedures (Release 11), pp. 1-160.
Sharp, "Common search space in ePDCCH", 3GPP TSG RAN WG1 Meeting #68bis, R1-121354, Jeju, Korea, Mar. 26-30, 2012, pp. 1-5.
NTT DOCOMO, Design Principle for E-PDCCH Multiplexing[online], 3GPP TSG RAN WG1 Meeting #69 R1-121976, internet<URL:http://www.3gpp.org/ftp/tsg_ran/WG1_RL1/TSGR1_69/Docs/R1-121976.zip> May 12, 2012.
Panasonic, ePDCCH search space design[online], 3GPP TSG RAN WG1 Meeting #70 R1-123289, Internet <URL:http://www.3gpp.org/ftp/tsg_ran/WG1_RL1/TSGR1_70/Docs/R1-123289.zip> 5, 2012.
Samsung, "Discussion on ePDCCH Design Issues", 3GPP TSG-RAN1#66 meeting R1-112517, Athens, Greece, Aug. 22-26, 2011.
New Postcom, Remaining aspects of DMRS for ePDCCH (online), 3gPP TSG RAN WG1 Meeting #70 R1-123441, internet Aug. 5, 2012.
Samsung, Remaining DMRS Aspects for EPDCCH (online), 3GPP TSG RAN WG1 #70bis R1-124382, internet, Sep. 29, 2012.
Texas Instruments, Scrambling sequence initialization of DMRS for ePDCCH (online), 3GPP TSG RAN WG1 #70bis R1-124574, internet, Oct. 12, 2012.

* cited by examiner

FIG. 7

UPLINK CONTROL CHANNEL LOGICAL RESOURCE

| $n_{PUCCH}$ | ORTHOGONAL CODE | CYCLIC SHIFT | m |
|---|---|---|---|
| 0 | OC0 | CS0 | $N_{F2}$ |
| 1 | OC1 | CS0 | $N_{F2}$ |
| 2 | OC2 | CS0 | $N_{F2}$ |
| 3 | OC0 | CS2 | $N_{F2}$ |
| 4 | OC1 | CS2 | $N_{F2}$ |
| 5 | OC2 | CS2 | $N_{F2}$ |
| ⋮ | ⋮ | ⋮ | ⋮ |
| 15 | OC0 | CS10 | $N_{F2}$ |
| 16 | OC1 | CS10 | $N_{F2}$ |
| 17 | OC2 | CS10 | $N_{F2}$ |
| 18 | OC0 | CS0 | $N_{F2}+1$ |
| 19 | OC1 | CS0 | $N_{F2}+1$ |
| 20 | OC2 | CS0 | $N_{F2}+1$ |
| ⋮ | ⋮ | ⋮ | ⋮ |

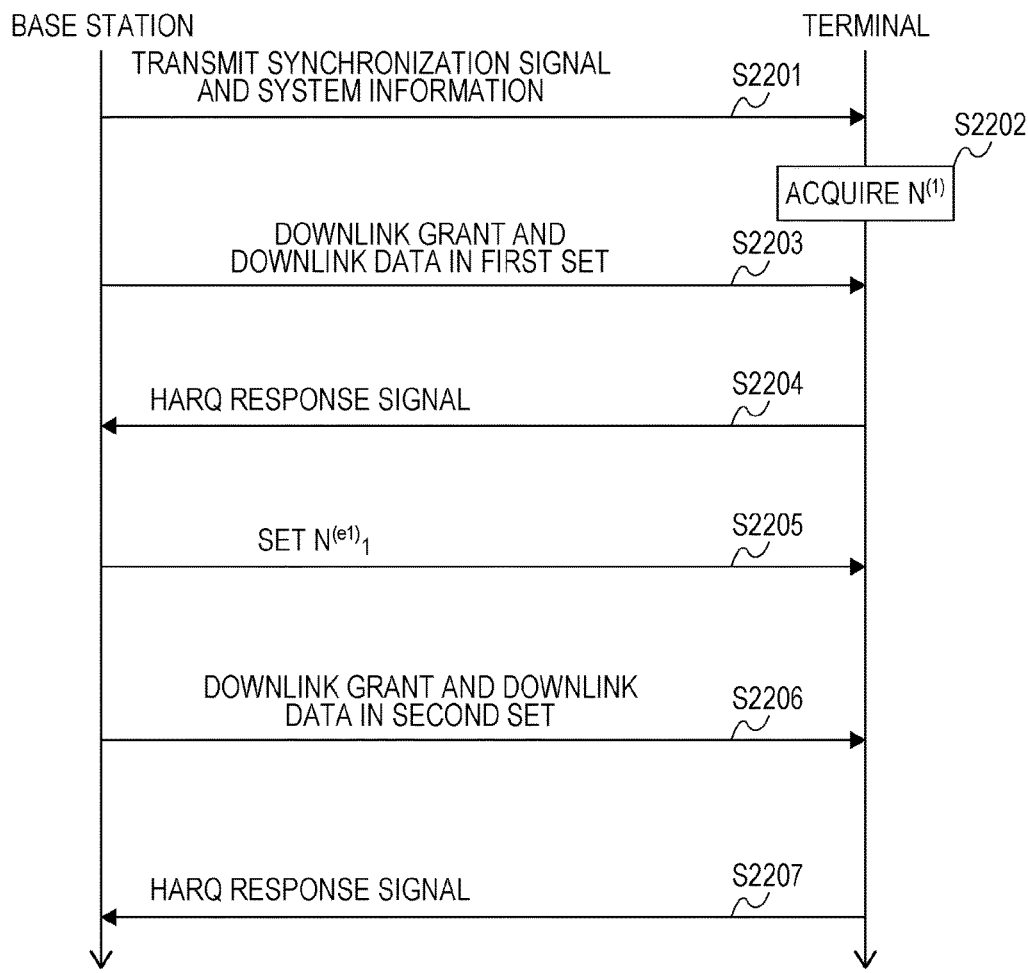

PHYSICAL CONTROL CHANNEL MONITORING

TECHNICAL FIELD

The present invention relates to a terminal, a base station, a communication system, and a communication method.

BACKGROUND ART

In a wireless communication system, such as Long Term Evolution (LTE) and LTE-Advanced (LTE-A) that are based on Third Generation Partnership Project (3GPP), or Wireless LAN and Worldwide Interoperability for Microwave Access (WiMAX) that are based on the Institute of Electrical and Electronics Engineers (IEEE), a base station (a base station device, a downlink transmission device, an uplink reception device, or an eNode B) and a terminal (a terminal device, a mobile station device, a downlink reception device, an uplink transmission device, or UE) each include multiple transmit and receive antennas and use a Multi Input Multi Output (MIMO) technology, resulting in spatially multiplexing a data signal and thus realizing high-speed data communication. Furthermore, particularly, in LTE and LTE-A, high spectral efficiency is realized using an Orthogonal Frequency Division Multiplexing (OFDM) scheme for downlink, and peak power is suppressed using a Single Carrier-Frequency Division Multiple Access (SC-FDMA) scheme for uplink. Additionally, a Hybrid ARQ (HARQ) that results from combining an Automatic Repeat Request (ARQ) and error correction coding is employed.

FIG. 23 is a diagram illustrating a configuration of an LTE communication system that performs the HARQ. In FIG. 23, a base station 2301 notifies a terminal 2302 of control information relating to downlink transmission data 2304 through Physical Downlink Control CHannel (PDCCH) 2303. First, the terminal 2302 detects the control information using information of a serving cell. If the control information is detected, the terminal 2302 extracts the downlink transmission data 2304 using the detected control information. The terminal 2302 that detects the control information reports HARQ response information indicating whether the extraction of the downlink transmission data 2304 succeeds or fails, to the base station 2301 through a Physical Uplink Control CHannel 2305 (PUCCH). At this time, a resource (a PUCCH resource) for the PUCCH 2305, which is usable by the terminal 2302, is determined explicitly/suggestively in a unique manner from a resource for the PDCCH 2303 to which the control information is assigned. Accordingly, when the terminal 2303 reports the HARQ response information, a PUCCH resource can be used that is dynamically assigned. Furthermore, the PUCCH resources are prevented from overlapping between terminals (NPL 1 and NPL 2).

CITATION LIST

Non Patent Literature

NPL 1: 3rd Generation Partnership Project; Technical Specification Group Radio Access Network; Evolved Universal Terrestrial Radio Access (E-UTRA); Physical Channels and Modulation (Release 11), December 2012, 3GPP TS 36 211 V11.1.0 (2012-12).

NPL 2: 3rd Generation Partnership Project; Technical Specification Group Radio Access Network; Evolved Universal Terrestrial Radio Access (E-UTRA); Physical layer procedures (Release 11), December 2012, 3GPP TS 36.213 V11.1.0 (2012-12).

SUMMARY OF INVENTION

Technical Problem

However, it is considered that in the wireless communication system, an enhanced Physical Downlink Control Channel, as well as a Physical Downlink Control Channel, is used in order to increase the number of terminals that one base station can accommodate. For this reason, with a method of transmitting and receiving the control information over the Physical Downlink Control Channel in the related art, transmission and reception parameter setting cannot be shared between a base station and a terminal in a case where the control information is transmitted and received over the enhanced Physical Downlink Control Channel. This is a factor in preventing improvement in transfer efficiency.

An object of the present invention, which is made in view of the problems described above, is to provide a base station, a terminal, a communication system and a communication method, in each of which transmission and reception parameter setting is capable of being efficiently performed even in a case where the base station notifies the terminal of control information not only through a physical downlink control channel but also through an enhanced physical downlink control channel, in a wireless communication system in which the base station and the terminal communicate with each other.

Solution to Problem (1) The present invention was made to solve the problem described above, and a terminal according to an aspect of the present invention is a terminal that performs communication with a base station in a cell, the terminal including: a downlink control channel detection module that monitors an enhanced physical downlink control channel in a first enhanced physical downlink control channel-physical resource block set and a second enhanced physical downlink control channel-physical resource block set, in which, in a case where the physical downlink control channel is monitored in the first enhanced physical downlink control channel-physical resource block set, the downlink control channel detection module uses a demodulation reference signal that is based on a scrambling sequence which is initialized by a prescribed parameter, and in which, in a case where the physical downlink control channel is monitored in the second enhanced physical downlink control channel-physical resource block set, the downlink control channel detection module uses a demodulation reference signal that is based on a scrambling sequence which is initialized by a parameter that is set individually for each terminal.

(2) A terminal according to an aspect of the present invention is the above-mentioned terminal, in which a search space in the first enhanced physical downlink control channel-physical resource block set may be a search space in which the physical downlink control channel added with a CRC scrambled by a paging identifier is monitored, and a search space in the second enhanced physical downlink control channel-physical resource block set may be a search space in which the physical downlink control channel added with the CRC that is scrambled by the paging identifier is not monitored.

(3) A terminal according to an aspect of the present invention is the above-mentioned terminal, in which the prescribed parameter may be a physical cell identifier in the cell.

(4) A terminal according to an aspect of the present invention is the above-mentioned terminal, in which the prescribed parameter may be a parameter that is obtained from system information.

(5) A base station according to an aspect of the present invention is a base station that performs communication with a terminal in a cell, the base station including: a physical control information notification module that arranges an enhanced physical downlink control channel in a first enhanced physical downlink control channel-physical resource block set or a second enhanced physical downlink control channel-physical resource block set, and notifies the terminal of a result of the arrangement, in which, in a case where the physical downlink control channel is arranged in the first enhanced physical downlink control channel-physical resource block set, the physical control information notification module adds a demodulation reference signal that is based on a scrambling sequence which is initialized by a prescribed parameter, and in which, in a case where the physical downlink control channel is arranged in the second enhanced physical downlink control channel-physical resource block set, the physical control information notification module adds a demodulation reference signal that is based on a scrambling sequence which is initialized by a parameter that is set individually for each terminal.

(6) A base station according to an aspect of the present invention is the above-mentioned base station, in which a search space in the first enhanced physical downlink control channel-physical resource block set may be a search space in which the physical downlink control channel added with a CRC scrambled by a paging identifier is monitored, and a search space in the second enhanced physical downlink control channel-physical resource block set may be a search space in which the physical downlink control channel added with the CRC scrambled by the paging identifier is not monitored.

(7) A base station according to an aspect of the present invention is the above-mentioned base station, in which the prescribed parameter may be a physical cell identifier in the cell.

(8) A base station according to an aspect of the present invention is the above-mentioned base station, in which the prescribed parameter may be a parameter that is obtained from system information.

(9) A communication system according to an aspect of the present invention is a communication system in which a base station and a terminal communicate with each other in a cell, in which the base station includes a physical control information notification module that arranges an enhanced physical downlink control channel in a first enhanced physical downlink control channel-physical resource block set or a second enhanced physical downlink control channel-physical resource block set, and notifies the terminal of a result of the arrangement, in which, in a case where the physical downlink control channel is arranged in the first enhanced physical downlink control channel-physical resource block set, the physical control information notification module adds a demodulation reference signal that is based on a scrambling sequence which is initialized by a prescribed parameter, in which, in a case where the physical downlink control channel is arranged in the second enhanced physical downlink control channel-physical resource block set, the physical control information notification module adds a demodulation reference signal that is based on a scrambling sequence which is initialized by a parameter that is set individually for each terminal, in which the terminal includes a downlink control channel detection module that monitors the enhanced physical downlink control channel in the first enhanced physical downlink control channel-physical resource block set and the second enhanced physical downlink control channel-physical resource block set, in which, in a case where the physical downlink control channel is monitored in the first enhanced physical downlink control channel-physical resource block set, the downlink control channel detection module uses the demodulation reference signal that is based on the scrambling sequence which is initialized by the prescribed parameter, and in which, in a case where the physical downlink control channel is monitored in the second enhanced physical downlink control channel-physical resource block set, the downlink control channel detection module uses the demodulation reference signal that is based on the scrambling sequence which is initialized by the parameter that is set individually for each terminal.

(10) A communication method according to an aspect of the present invention is a communication method for use in a terminal that performs communication with a base station in a cell, the communication method including: a step of monitoring an enhanced physical downlink control channel in a first enhanced physical downlink control channel-physical resource block set and a second enhanced physical downlink control channel-physical resource block set, in which, in the step of monitoring, in a case where the physical downlink control channel is monitored in the first enhanced physical downlink control channel-physical resource block set, a demodulation reference signal that is based on a scrambling sequence which is initialized by a prescribed parameter is used, and in which, in the step of monitoring, in a case where the physical downlink control channel is monitored in the second enhanced physical downlink control channel-physical resource block set, a demodulation reference signal that is based on a scrambling sequence which is initialized by a parameter that is set individually for each terminal is used.

(11) A communication method according to an aspect of the present invention is a communication method for use in a base station that performs communication with a terminal in a cell, the communication method including: a step of arranging an enhanced physical downlink control channel in a first enhanced physical downlink control channel-physical resource block set or a second enhanced physical downlink control channel-physical resource block set, and notifying the terminal of a result of the arrangement, in which, in the step of arranging, in a case where the physical downlink control channel is arranged in the first enhanced physical downlink control channel-physical resource block set, a demodulation reference signal that is based on a scrambling sequence which is initialized by a prescribed parameter is added, and in which, in the step of arranging, in a case where the physical downlink control channel is arranged in the second enhanced physical downlink control channel-physical resource block set, a demodulation reference signal that is based on a scrambling sequence which is initialized by a parameter that is set individually for each terminal is added.

Advantageous Effects of Invention

According to the present invention, in a wireless communication system in which a base station and a terminal communicate with each other, transmission and reception parameter setting can be efficiently performed even in a case where the base station notifies the terminal of control information not only through a physical downlink control channel but also through an enhanced physical downlink control channel.

BRIEF DESCRIPTION OF DRAWINGS

FIG. 7 is a correspondence table illustrating an uplink control channel logical resource according to the first embodiment.

FIG. 21 is a diagram illustrating one example of a correspondence between an ARO field and an offset value that is indicated in the ARO field, according to the first embodiment.

FIG. 22 is a diagram illustrating another example of the flow for the downlink data transmission and for the response procedure for the downlink data transmission according to the first embodiment.

DESCRIPTION OF EMBODIMENTS

First Embodiment

A first embodiment of the present invention will be described below. A communication system according to the first embodiment includes a base station (a base station device, a downlink transmission device, an uplink reception device, or an eNode B) and a terminal (a terminal device, a mobile station device, a downlink reception device, an uplink transmission device, or User Equipment (UE)).

Figure 1:
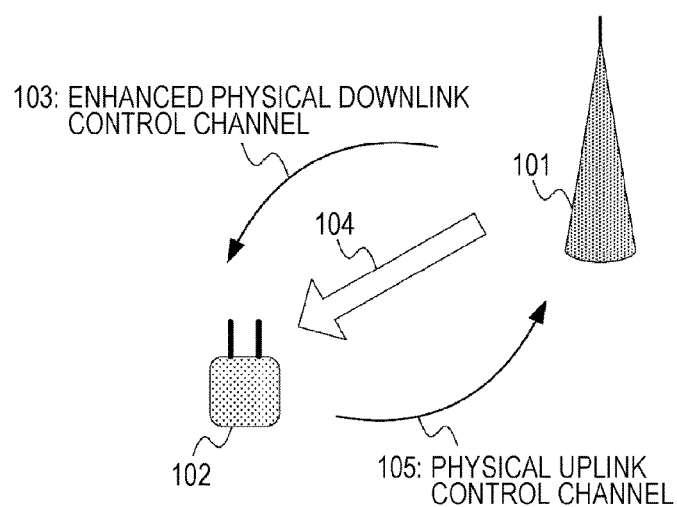
FIG. 1 is a diagram illustrating a configuration example of a communication system according to a first embodiment of the present invention.

FIG. 1 is a diagram illustrating a configuration example of the communication system according to the first embodiment. In FIG. 1, a base station 101 notifies a terminal 102 of control information relating to downlink transmission data 104 through a PDCCH and/or an Enhanced Physical Downlink Control Channel (Enhanced PDCCH) 103. The terminal 102 detects the control information. In a case where the control information is detected, the terminal 102 extracts the downlink transmission data 104 using the detected control information. The terminal 102 that detects the control information reports HARQ response information (which is also referred to as an "Ack/Nack" or a "HARK-ACK") indicating whether the extraction of the downlink transmission data 104 succeeds or fails, to the base station 101 through a PUCCH. At this time, in a case where the terminal 102 detects the control information in the PDCCH, a resource for a Physical Uplink Control Channel (PUCCH) 105 that is usable by the terminal 102 is explicitly/suggestively determined in a unique manner from a PDCCH resource to which the control information is assigned. Furthermore, in a case where the terminal 102 detects the control information in the EPDCCH 103, the resource for the PUCCH 105 that is usable by the terminal 102 is explicitly/suggestively determined in a unique manner from a resource for the EPDCCH 103 to which the control information is assigned.

Figure 2:
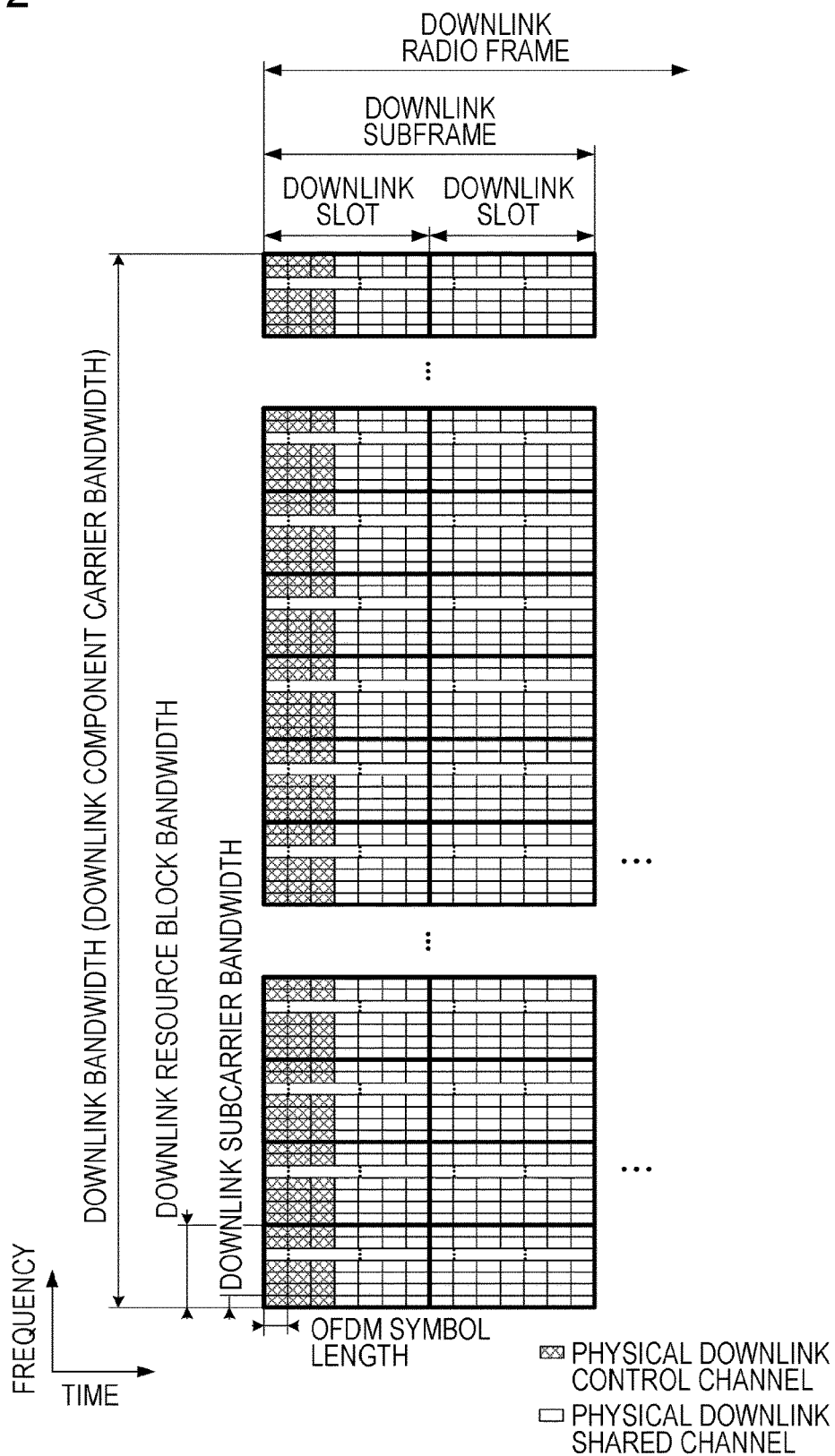
FIG. 2 is a diagram illustrating one configuration example of a downlink radio frame according to the first embodiment.

FIG. 2 is a diagram illustrating one configuration example of a downlink radio frame according to the present embodiment. For downlink, an OFDM access scheme is used. For downlink, the PDCCH, the EPDCCH, a Physical Downlink Shared CHannel (PDSCH), and the like are assigned. The downlink radio frame is configured from a downlink resource block (RB) pair. The downlink RB pair is a unit of assignment or the like of the downlink radio resource and is constructed from a frequency bandwidth (a RB bandwidth) with a prescribed width and a time duration (two slots=1 subframe). One downlink RB pair is constructed from 2 downlink RBs (RB bandwidth×slot) that are continuous in a time domain. One downlink RB is constructed from 12 subcarriers in a frequency domain. Furthermore, in the time domain, in a case where a normal cyclic prefix is added, one downlink RB is configured from 7 OFDM symbols, and in a case where a cyclic prefix is longer than usual is added, one downlink RB is configured from 6 OFDM symbols. A region that is specified by one subcarrier in the frequency domain and one OFDM symbol in the time domain is referred to as a resource element (RE). The Physical Downlink Control Channel is a physical channel over which downlink control information is transmitted such as a terminal device identifier, scheduling information on the Physical Downlink Shared Channel, scheduling information on a Physical Uplink Shared Channel, a modulation scheme, a coding rate, or a retransmission parameter. Moreover, here, a downlink subframe in one component carrier (CC) is described, but the downlink subframe is specified for every component carrier and the downlink subframe is mostly synchronized between the CCs.

Moreover, although not illustrated here, a reference signal (RS) may be mapped to the downlink subframe. As the reference signals, there are a cell-specific reference signal (Cell-Specific RS (CRS)) that is transmitted at the same transmission port as the PDCCH, a channel state information reference signal (CSIRS) that is used for measurement of channel state information (CSI), a terminal-specific reference signal (UE-specific RS (UERS)) that is transmitted at the same transmission port as one portion of the PDSCH, a demodulation reference signal (Demodulation RS (DMRS)) that is transmitted at the same transmission port as the EPDCCH, and the like. Furthermore, a carrier in which the CRS is not mapped may be satisfactory. At this time, the same signal (referred to as an enhanced synchronization signal) as a signal that corresponds to one or several transmission ports (for example, only a transmission port 0) or all transmission ports for the CRS can be inserted, as a signal for tracking a time and/or a frequency, into one or several subframes (for example, first and sixth subframes of a radio frame).

Figure 3:
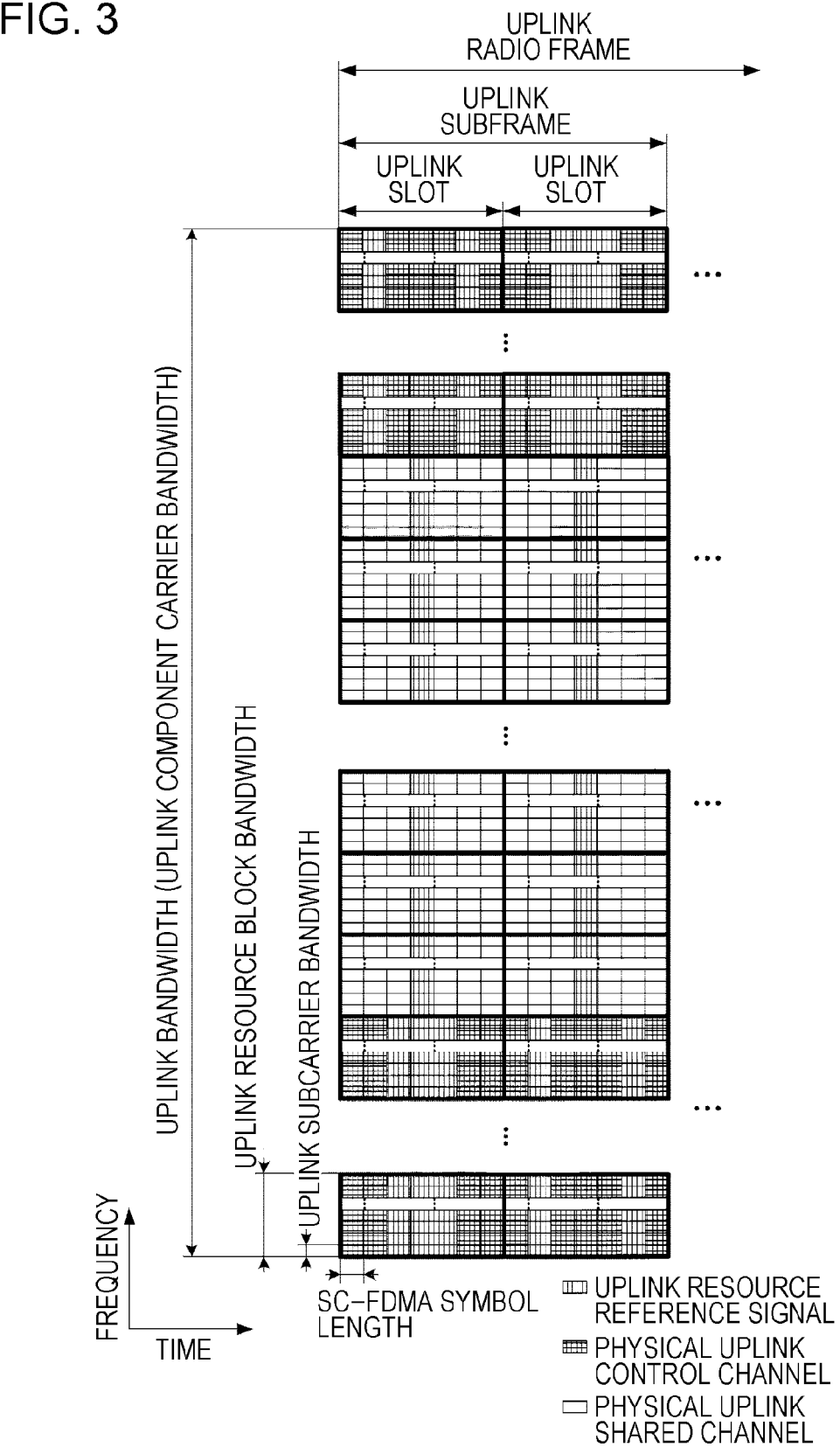
FIG. 3 is a diagram illustrating one configuration example of an uplink radio frame according to the first embodiment.

FIG. 3 is a diagram illustrating one configuration example of an uplink radio frame according to the present embodiment. For uplink, an SC-FDMA scheme is used. For uplink, the Physical Uplink Shared Channel (PUSCH), the PUCCH, and the like are assigned. Furthermore, an uplink reference signal is assigned to one portion of the PUSCH or of the PUCCH. The uplink radio frame is configured from an uplink RB pair. The uplink RB pair is a unit of assignment or the like of an uplink radio resource and is constructed from a frequency bandwidth (RB bandwidth) with a prescribed width and a time duration (two slots=1 subframe). One uplink RB pair is configured from two uplink RBs (RB bandwidth×slot) that are continuous in the time domain. One uplink RB pair is configured from 12 subcarriers in the frequency domain. In the time domain, in a case where a normal cyclic prefix is added, one uplink RB pair is configured from 7 SC-FDMA symbols, and in a case where a cyclic prefix is longer than usual is added, one uplink RB pair is configured from 6 SC-FDMA symbols. Moreover, here, an uplink subframe is entered in one CC, but the uplink subframe is specified for every CC.

Figure 4:
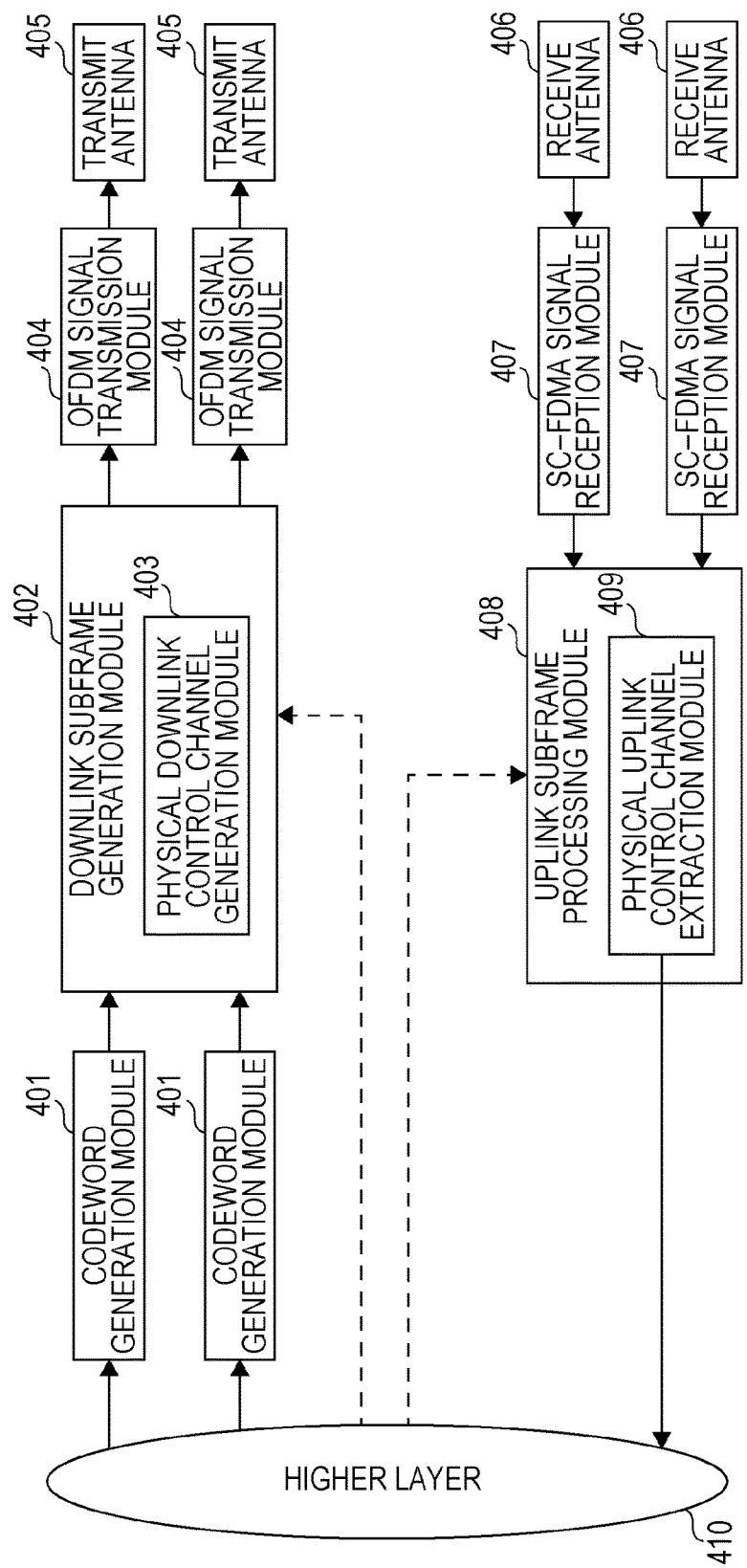
FIG. 4 is a schematic diagram illustrating one example of a block configuration of a base station according to the first embodiment.

FIG. 4 is a schematic diagram illustrating one example of a block configuration of the base station 101 according to the present embodiment. The base station 101 has a codeword generation module 401, a downlink subframe generation module 402, an OFDM signal transmission module (a physical control information notification module) 404, a transmit antenna (a base station transmit antenna) 405, a receive antenna (a base station receive antenna) 406, an SC-FDMA signal reception module (a response information reception module) 407, an uplink subframe processing module 408, and a higher layer (a higher layer control information notification module) 410. The downlink subframe generation module 402 has Physical Downlink Control Channel generation module 403. Furthermore, the uplink subframe processing module 408 has a Physical Uplink Control Channel extraction module 409.

Figure 5:
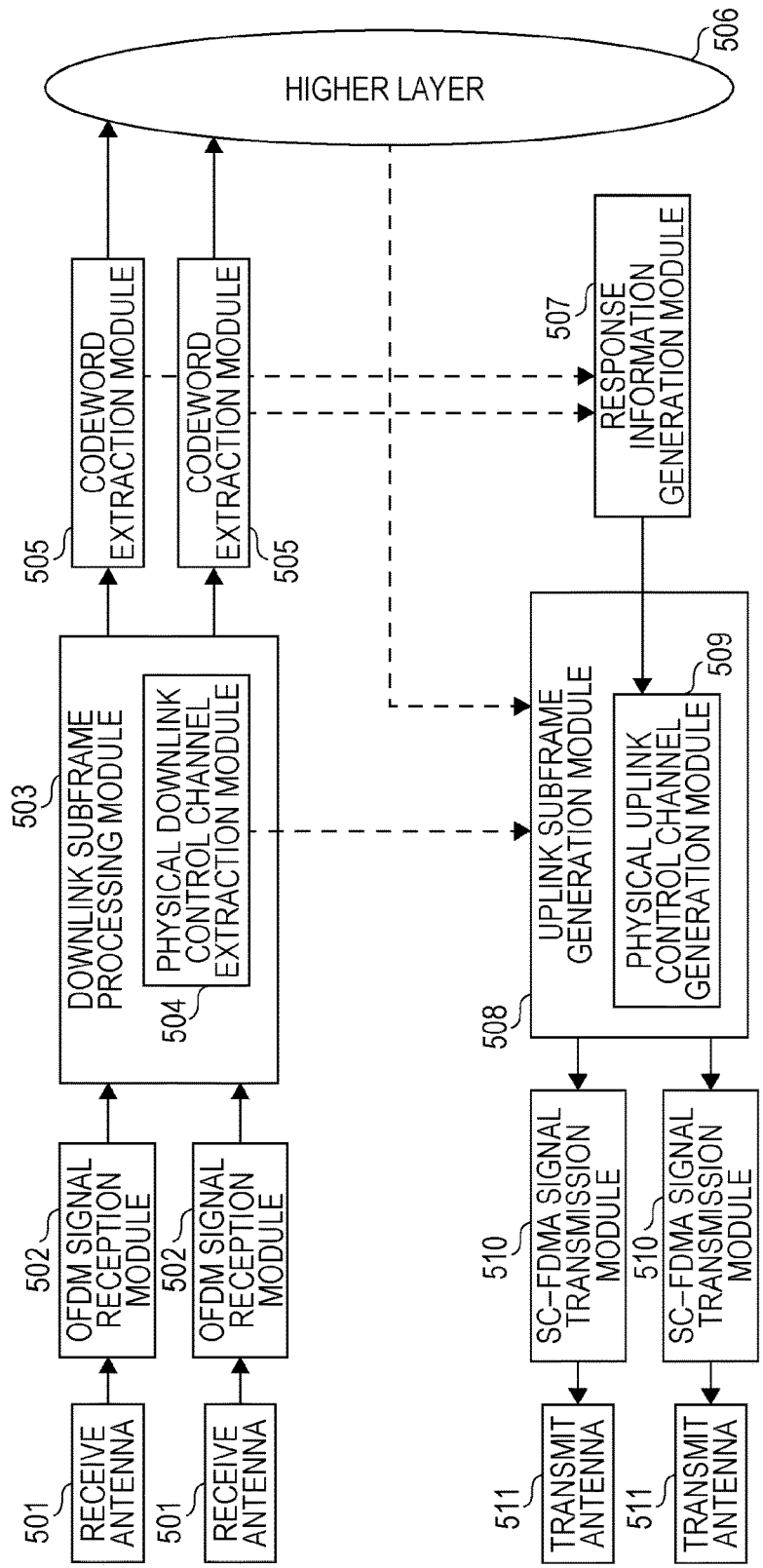
FIG. 5 is a schematic diagram illustrating one example of a block configuration of a terminal according to the first embodiment.

FIG. 5 is a schematic diagram illustrating one example of a block configuration of the terminal 102 according to the present embodiment. The terminal 102 includes a receive antenna (a terminal receive antenna) 501, an OFDM signal reception module (a downlink reception module) 502, a downlink subframe processing module 503, a codeword extraction module (a data extraction module) 505, a higher layer (a higher layer control information acquisition module) 506, a response information generation module 507, an uplink subframe generation module 508, an SC-FDMA signal transmission module (a response transmission module) 510, and a transmit antenna (a terminal transmit antenna) 511. The downlink subframe processing module 503 has a Physical Downlink Control Channel extraction module (a downlink control channel detection module) 504. Furthermore, the uplink subframe generation module 508 has a Physical Uplink Control Channel generation module (an uplink control channel generation module) 509.

First, flows of downlink data for transmission and reception are described referring to FIGS. 4 and 5. In the codeword generation module 401 of the base station 101, types of processing, such as error correction coding and rate matching processing, are performed on transmission data (also referred to as a transport block) that is delivered from the higher layer 410, and a codeword is generated. A maximum of 2 codewords is transmitted at the same time in one subframe in one cell. In the downlink subframe generation module 402, the downlink subframe is generated according to an instruction of the higher layer 410. First, modulation processing, such as Phase Shift Keying (PSK) modulation or Quadrature Amplitude Modulation (QAM) is performed on the codeword that is generated in the codeword generation module 401, and thus the resulting codeword is converted into a sequence of modulation symbols. Furthermore, the sequence of modulation symbols is mapped onto the REs within one or several RBs, and the downlink subframe is generated for every antenna port by performing precoding processing. Moreover, the RE for downlink is specified as corresponding to each subcarrier on each OFDM symbol. At this time, a sequence of transmission data that is provided from the higher layer 410 includes dedicated (individual) control information (higher layer control information) for Radio Resource Control (RRC) signaling. Furthermore, the EPDCCH is generated in the Physical Downlink Control Channel generation module 403. At this point, the control information (the downlink control information, and a downlink grant) included in the EPDCCH includes pieces of information, such as Modulation and Coding Scheme (MCS) indicating the modulation scheme and the like for downlink, downlink resource assignment indicating the RB that is used for data transmission, control information (a redundancy version•a HARQ process number•a new data indicator) on a HARQ that is used for HARQ control, and a PUCCH-Transmission Power Control (TPC) command that is used for closed loop transmission power control of the PUCCH. The downlink subframe generation module 402 maps the EPDCCH to the REs within the downlink subframe according to the instruction of the higher layer 410. At this time, the DMRS for demodulating the EPDCCH is also mapped to the REs within the downlink subframe. At this point, the EPDCCH and the DMRS are generated and are mapped using a related parameter that will be described below. The downlink subframe for every antenna port, which is generated in the downlink subframe generation module 402, is modulated into an OFDM signal in the OFDM signal transmission module 404 and is transmitted through the transmit antenna 405. Moreover, the downlink subframe generation module 402 can also have an ability to generate the PDCCH.

In the terminal 102, the OFDM signal is received through the receive antenna 501 in the OFDM signal reception module 502 and OFDM demodulation processing is implemented. The downlink subframe processing module 503 first detects the EPDCCH in the Physical Downlink Control Channel extraction module 504. More specifically, the EPDCCH is decoded as being transmitted in a domain to which the EPDCCH can be assigned, and checks for a Cyclic Redundancy Check bit that is added in advance (blind decoding). That is, the Physical Downlink Control Channel extraction module 504 monitors the EPDCCH. In a case where the CRC bit is consistent with an ID (one terminal-specific identifier that is assigned to one terminal, such as a Cell-Radio Network Temporary Identifier (C-RNTI), a Semi-persistent scheduling-C-RNTI (SPS-C-RNTI), or Temporaly C-RNTI), that is allocated in advance from the base station, the downlink subframe processing module 503 recognizes that the EPDCCH can be detected and extracts the PDSCH using the control information that is included in the detected EPDCCH. More specifically, RE demapping processing and demodulation processing that correspond to RE mapping processing and the modulation processing, respectively, in the downlink subframe generation module 402 are implemented. The PDSCH that is extracted from the received downlink subframe is delivered to the codeword extraction module 505. In the codeword extraction module 505, rate matching processing and error correction decoding that correspond to the rate matching processing and the error correction coding, respectively, in the codeword generation module 401 are implemented, and the transport block is extracted and is provided to the higher layer 506. That is, in a case where the Physical Downlink Control Channel extraction module 504 detects the PDCCH or the EPDCCH, the codeword extraction module 505 extracts the transmission data in the PDSCH associated with the detected PDCCH or EPDCCH, and delivers the extracted transmission data to the higher layer 506. Moreover, the Physical Downlink Control Channel extraction module 504 can also have an ability to monitor the PDCCH.

Next, a flow for transmission and reception of the HARQ response information responding to downlink transmission data is described. In the terminal 102, when it is determined whether extraction of the transport block succeeds in the codeword extraction module 505, information indicating the success or the failure is delivered to the response information generation module 507. In the response information generation module 507, the HARQ response information is generated and is delivered to the Physical Uplink Control Channel generation module 509 within the uplink subframe generation module 508. In the Physical Uplink Control Channel generation module 509 within the uplink subframe generation module 508, based on a parameter that is provided from the higher layer 506 and on a resource in which the PDCCH or the EPDCCH is arranged in the Physical Downlink Control Channel extraction module 504, the PUCCH including the HARQ response information (uplink control information) is generated and the generated PUCCH is mapped to the RBs within the uplink subframe. That is, response information is mapped to a PUCCH resource, and the PUCCH is generated. The SC-FDMA signal transmission module 510 implements SC-FDMA modulation on the uplink subframe and thus generates an SC-FDMA signal, and transmits the generated SC-FDMA signal through the transmit antenna 511.

In the base station 101, the SC-FDMA signal is received in the SC-FDMA signal reception module 407 through the receive antenna 406, and SC-FDMA demodulation processing is implemented. In the uplink subframe processing module 408, according to the instruction of the higher layer 410, the RB to which the PUCCH is mapped is extracted, and HARQ response control information that is included in the PUCCH in the Physical Uplink Control Channel extraction module 409 is extracted. The extracted HARQ response control information is provided to the higher layer 410. The HARQ response control information is used for the HARQ control by the higher layer 410.

Next, the PUCCH resource in the uplink subframe generation module 508 is described. The HARQ response control information is spread onto an SC-FDMA sample domain using a pseudo Constant-Amplitude Zero-Auto Correlation (CAZAC) sequence that is cyclic-shifted, and is spread onto 4 SC-FDMA symbols within a slot using an orthogonal code OCC (Orthogonal Cover Code) of which a code length is 4. Furthermore, symbols that are spread using 2 codes are mapped to the 2 RBs that have different frequencies. In this manner, the PUCCH resource is specified by 3 elements that are an amount of cyclic shift, an orthogonal code, and an RB that is mapped. Moreover, the cyclic shift in the SC-FDMA sample domain can be expressed with an amount of phase rotation that increases uniformly in the frequency domain.

Figure 6:
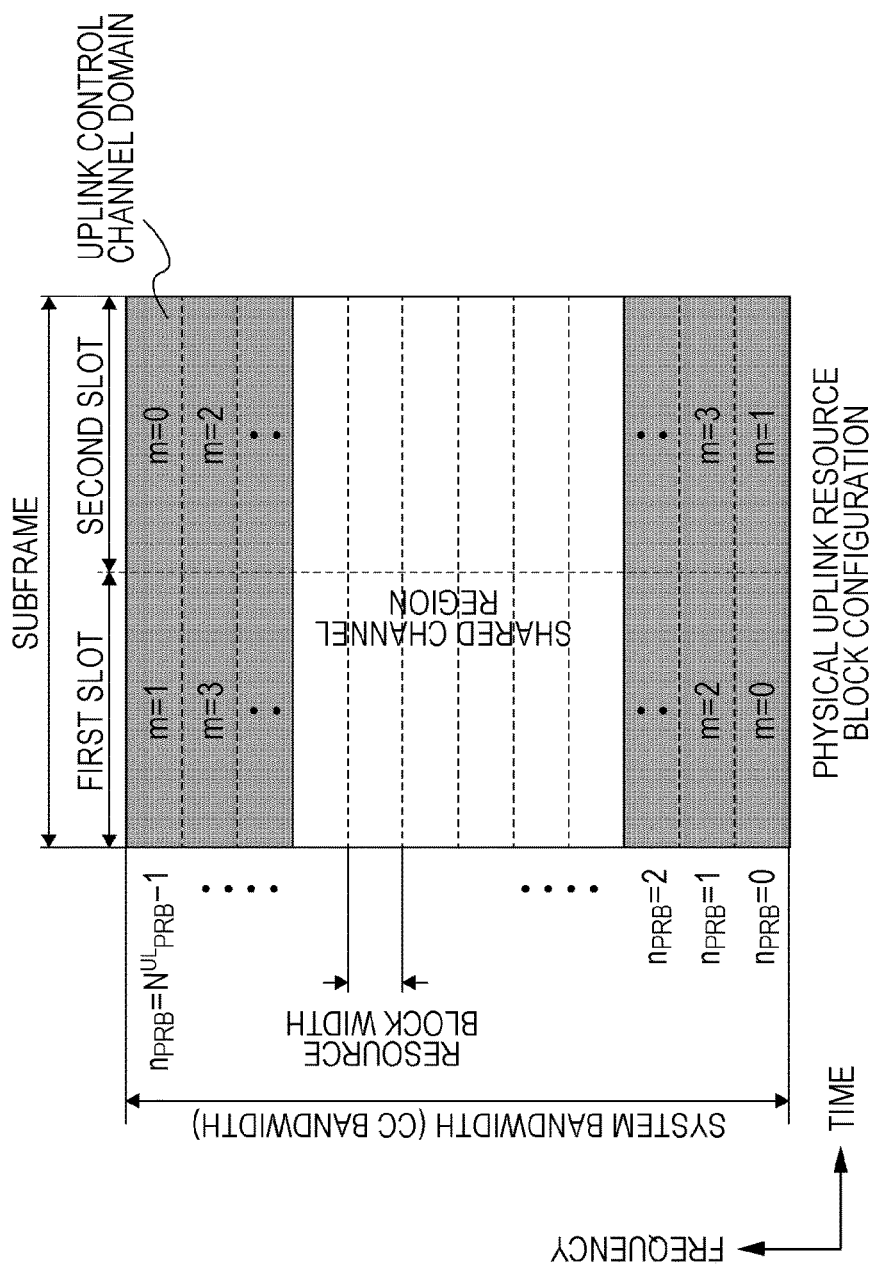
FIG. 6 is a diagram illustrating a configuration of a physical uplink resource block in an uplink control channel domain to which a PUCCH is assigned, according to the first embodiment.

FIG. 6 is a diagram illustrating a configuration of a physical uplink resource block (an uplink control channel physical resource) in an uplink control channel domain to which the PUCCH is assigned. Each pair of RBs is configured from 2 RBs that have frequencies that are different in a first slot and a second slot. One PUCCH is arranged in a pair of RBs, each of which is any of m=0, 1, 2, . . . .

FIG. 7 is a correspondence table illustrating an uplink control channel logical resource. This is one example of the PUCCH resource in a case where 3 orthogonal codes, that is, OC0, OC1, and OC2, amounts of 6 cyclic shifts, that is, CS0, CS2, CS4, CS6, CS8, and CS10, and m indicating the frequency resource are assumed as elements that construct the PUCCH. Combinations of an orthogonal code, an amount of cyclic shift, and m are uniquely specified, corresponding to $n_{PUCCH}$ that is an index indicating the PUCCH resource (an uplink control channel logical resource). Moreover, a correspondence between $n_{PUCCH}$ that is illustrated in FIG. 7, and a combination of the orthogonal code, the amount of cyclic shift, and the m is one example, and a different correspondence may be satisfactory. For example, a correspondence may be made in such a manner that between contiguous $n_{PUCCH}$'s, the amount of cyclic shift changes or the m changes. Furthermore, CS1, CS3, CS5, CS7, CS9, and CS11 that are different in the amount of cyclic shift from CS0, CS2, CS4, CS6, CS8, and CS10 may be used. Furthermore, here, a case where a value of m is $N_{F2}$ or greater is illustrated. Frequency resources, m of which is less than $N_{F2}$, are $N_{F2}$ frequency resources that are reserved for the PUCCH transmission for feedback of the channel state information.

Figure 8:
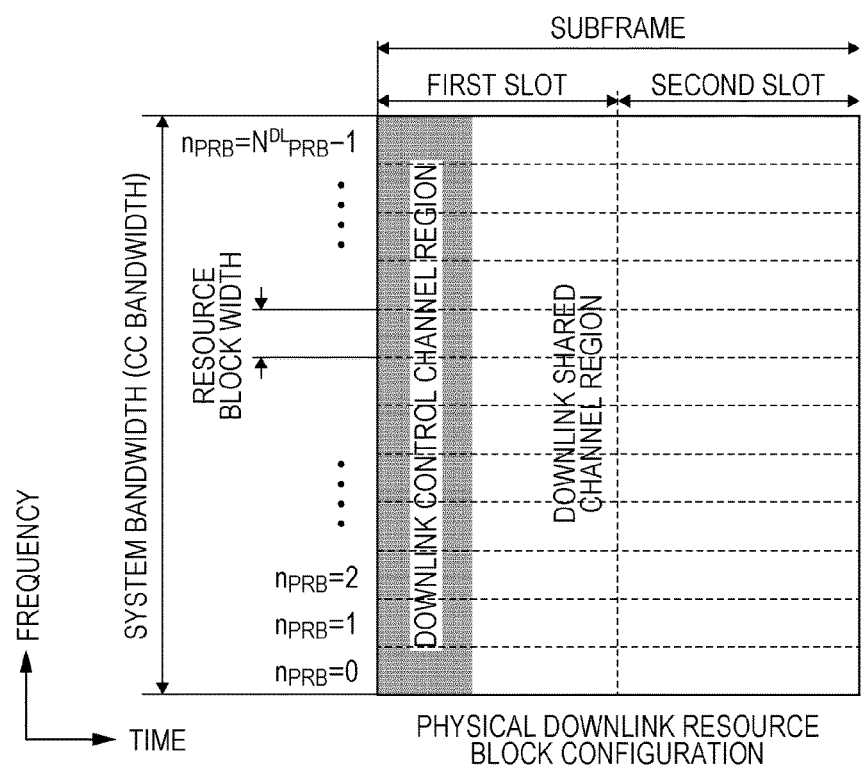
FIG. 8 is a diagram illustrating a physical resource block PRB in a PDCCH region and a PDSCH region according to the first embodiment.

Next, the PDCCH and the EPDCCH are described. FIG. 8 is a diagram illustrating a physical resource block RPB (Physical RB) in a PDCCH region and a PDSCH region. The RB on an actual subframe is referred to as the PRB. An $N^{DL}_{PRB}$ is the number of PRBs that are arranged in the frequency direction within a downlink CC. A number $n_{PRB}$ is allocated to the PRB (or a PRB pair), and the $n_{PRB}$ is set to be 0, 1, 2, and so forth up to $N^{DL}_{PRB}-1$ in order of increasing frequency. Moreover, the number here can also be expressed as an index.

The PDCCH is configured from multiple Control Channel Elements (CCEs) within the PDCCH region. The CCEs are configured from multiple downlink resource elements REs (each of which is a resource specified by one OFDM symbol and one subcarrier). A number $n_{CCE}$ for identifying the CCE is given to the CCE within the PDCCH region. The numbering of the CCEs is performed based on a prescribed rule. The PDCCH is constructed from an aggregation (CCE aggregation) that is constructed from multiple CCEs. The number of CCEs that constructs the aggregation is referred to as a "CCE aggregation level." The CCE aggregation level that constructs the PDCCH is set in the base station 101, in accordance with the coding rate that is set to be in the PDCCH and the number of bits of Downlink Control Information (DCI; the downlink control information) (the control information that is transmitted over the PDCCH or the EPDCCH) that is included in the PDCCH. Moreover, a combination of the CCE aggregation levels that are able to be used for a terminal is determined in advance. Furthermore, the aggregation that is constructed from n CCEs is referred to "CCE aggregation level n."

One REG (an RE group) is constructed from 4 REs that are adjacent in the frequency domain. Additionally, one CCE is constructed from 9 different REGs that are distributed in the frequency domain and the time domain within the PDCCH region. Specifically, interleave is performed, in units of REGs, on the entire downlink CC by using a block interleaver with respect to all numbered REGs, and one CCE is constructed from 9 REGs that are consecutively numbered after interleaving.

A search space (SS) that is a space (a search space or a retrieval space) from which the PDCCH is retrieved is set to be in each terminal. The SS is configured from multiple CCEs. A number is allocated in advance to the CCE, and the SS is constructed from multiple CCEs that are consecutively numbered. The number of CCEs that construct a certain SS is determined in advance. The SS of the each CCE aggregation level is constructed from a aggregation of candidates for multiple PDCCHs. The SS is categorized into a cell-specific common search space CSS (cell-specific SS, common SS) in which the number of the CCE that has the smallest number, among the CCEs that construct the SS, is common within the cell, and a terminal-specific search space (UE-specific SS) in which the number of the CCE that has the smallest number is specific to the terminal. The PDCCH to (in) which the control information, such as system information or information relating to paging, that multiple terminals 102 read, is assigned (included), or the PDCCH to (in) which a downlink/uplink grant indicating an instruction for fallback to or random access to a low-level transmission scheme, or for transmission power control is assigned (included) can be arranged in the CSS. More specifically, the PDCCH to which the CRC that is scrambled by a system information identifier (System Information-RNTI (SI-RNTI)), a paging identifier (Paging-RNTI (P-RNTI)), a random access identifier (Random Access-RNTI (RA-RNTI)), or a transmission power control identifier (TPC-RNTI) is added is arrangeable in the CSS. On the other hand, the PDCCH to which the CRC that is scrambled by one of these identifiers is added cannot be arranged in the USS. Moreover, one of these identifiers is an identifier that is assigned to one or more terminals (or multiple terminals), and one or more terminals may perform reception processing on the PDCCH to which the CRC that is scrambled by one of these identifiers is added.

The base station 101 transmits the PDCCH using one or more CCEs within the SS that are set in the terminal 102. The terminal 102 performs decoding of a received signal using one or more CCEs within the SS, and performs processing for detecting the PDCCH that is destined for the terminal 102 itself. As described above, the processing is referred to as the blind decoding. The terminal 102 sets the SS that varies from one CCE aggregation level to another. Thereafter, the terminal 102 performs the blind decoding using a prescribed combination of the CCEs within the SS that varies from one CCE aggregation level to another. In other words, the terminal 102 performs the blind decoding on the candidate for each PDCCH within the SS that varies from one CCE aggregation level to another. This sequence of processing operations in the terminal 102 is referred to as monitoring of the PDCCH.

Figure 9:
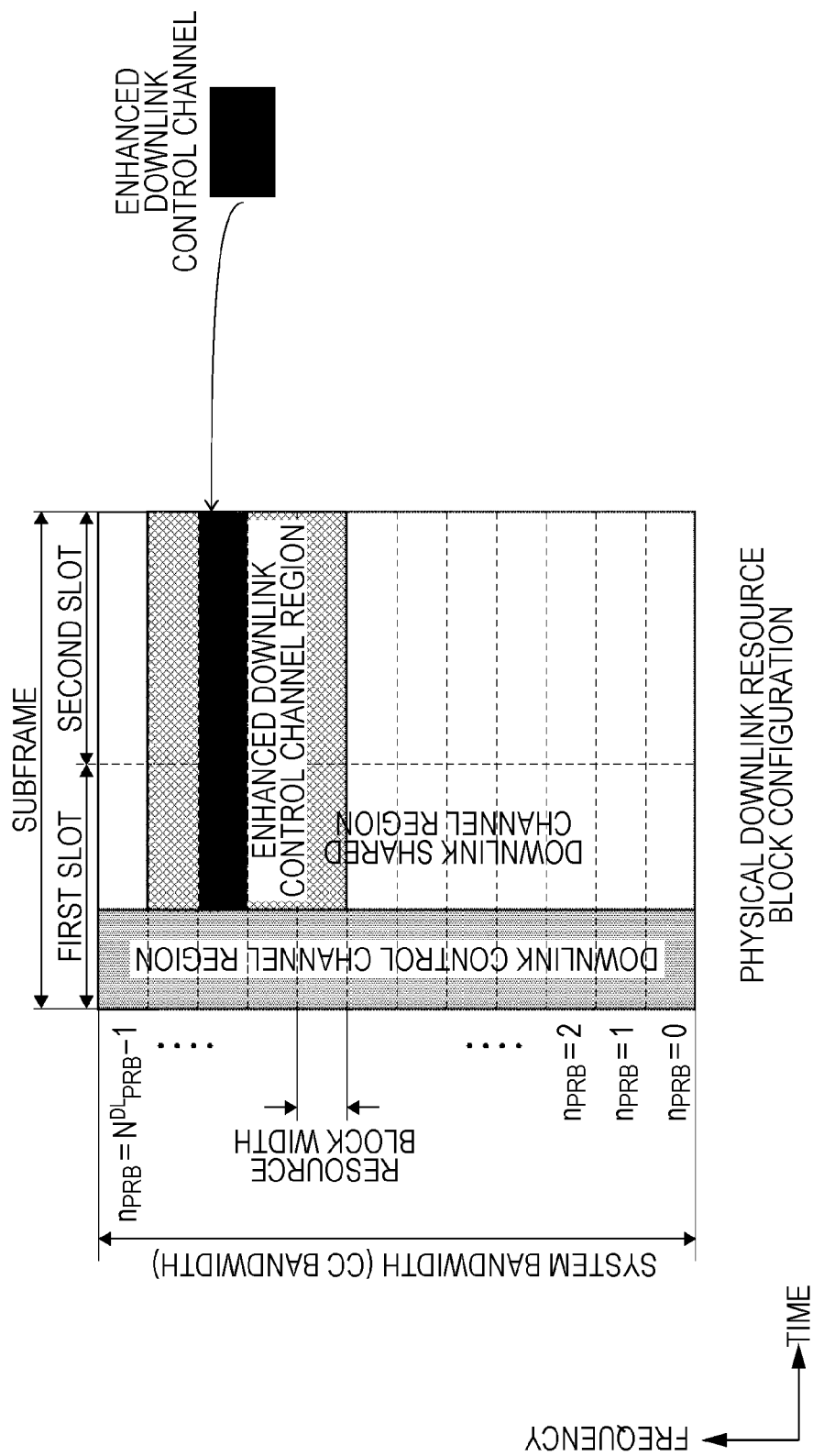
FIG. 9 is a diagram illustrating one example of mapping of an EPDCCH according to the first embodiment.

Next, FIG. 9 is a diagram illustrating one example of mapping of the EPDCCH in an EPDCCH region. With this localized mapping scheme, one EPDCCH is mapped to the RE on a local band. More specifically, 16 Enhanced REGs are specified within one PRB pair. Within the PRB pair, all REs except for the DMRS are numbered from 0 to 15 in alternating frequency and time directions, that is, first in the frequency direction and then in the time direction. This serves as an index for the 16 EREGs. As a result, in a case of a normal cyclic prefix, each EREG is configured to include 9 REs. With the localized mapping scheme, in a case where at least an aggregation level is low (for example, in a case where the aggregation level is 4 or below), one EPDCCH is mapped to the EREG within one PRB pair.

Figure 10:
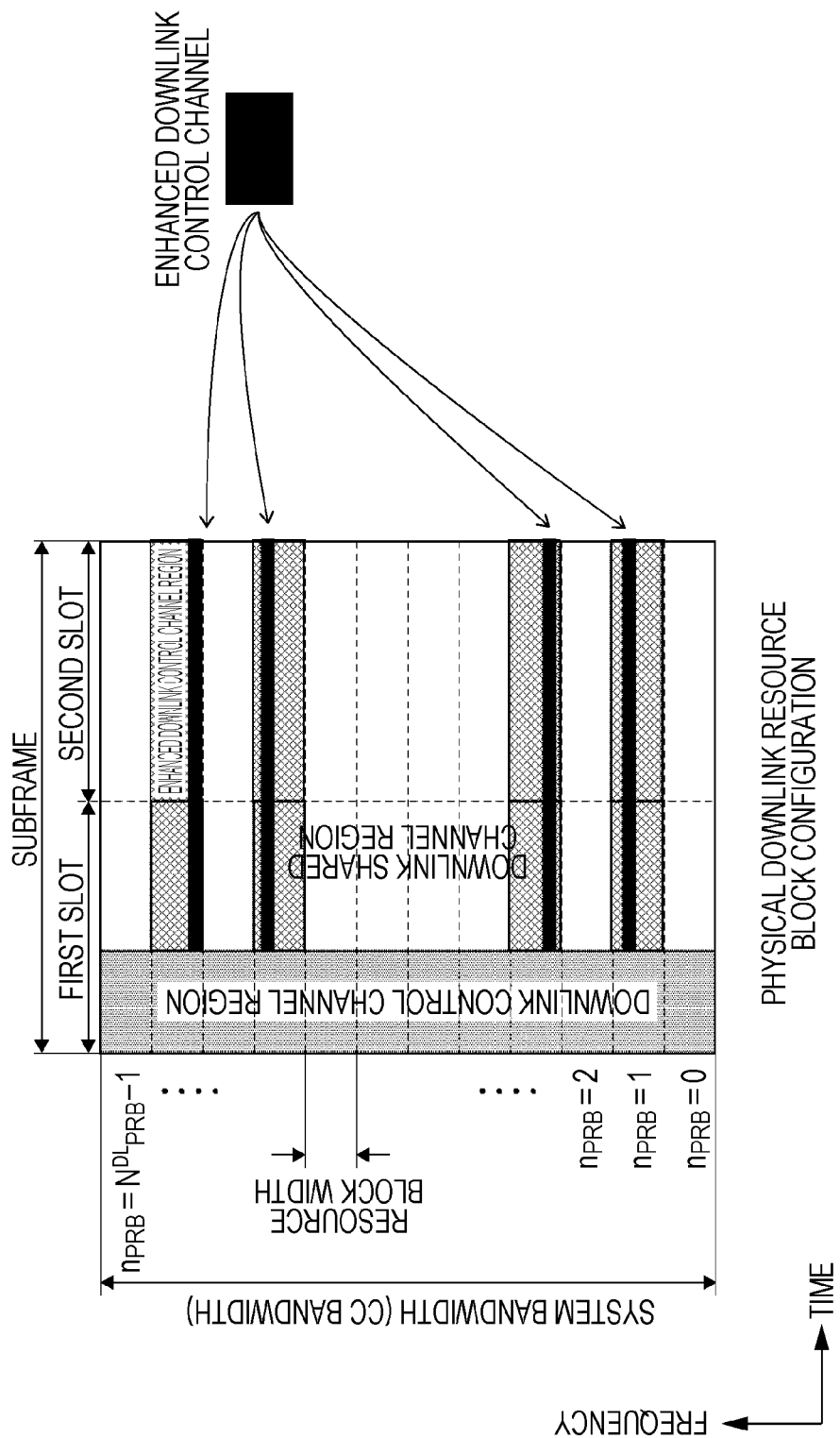
FIG. 10 is a diagram illustrating another example of the mapping of the EPDCCH according to the first embodiment.

Next, FIG. 10 is a diagram illustrating another example of the mapping of the EPDCCH in the EPDCCH region. With this distributed mapping scheme, one EPDCCH is mapped to the RE on a band that is at a distance on a local band frequency axis. More specifically, with the distributed mapping scheme, in the case where the aggregation level is low (for example, in a case where the aggregation level is 1 or 2), one EPDCCH is mapped across the EREGs in two or more PRB pairs.

In this manner, one or several of (or all of) the PRB pairs are configured as the EPDCCH region (a domain in which the EPDCCH can be potentially arranged). Additionally, with the mapping scheme that is indicated explicitly or implicitly/suggestively, the EPDCCH is arranged in one or several of (or all of) the PRB pairs in the EPDCCH region. Here, the EPDCCH region can be defined as a set (an Enhanced Physical Downlink Control Channel physical resource block set: an EPDCCH-PRB set) of PRB pairs in the frequency direction. On the other hand, the EPDCCH region can be defined as the set (the Enhanced Physical Downlink Control Channel physical resource block set: the EPDCCH-PRB set) of PRB pairs in the frequency direction and as the OFDM symbol in the time direction. At this time, as the OFDM symbol in the time direction, a number of the first OFDM symbol as a starting position within a subframe, among OFDM symbols to which the EPDCCH is mapped, may be set.

Figure 11:
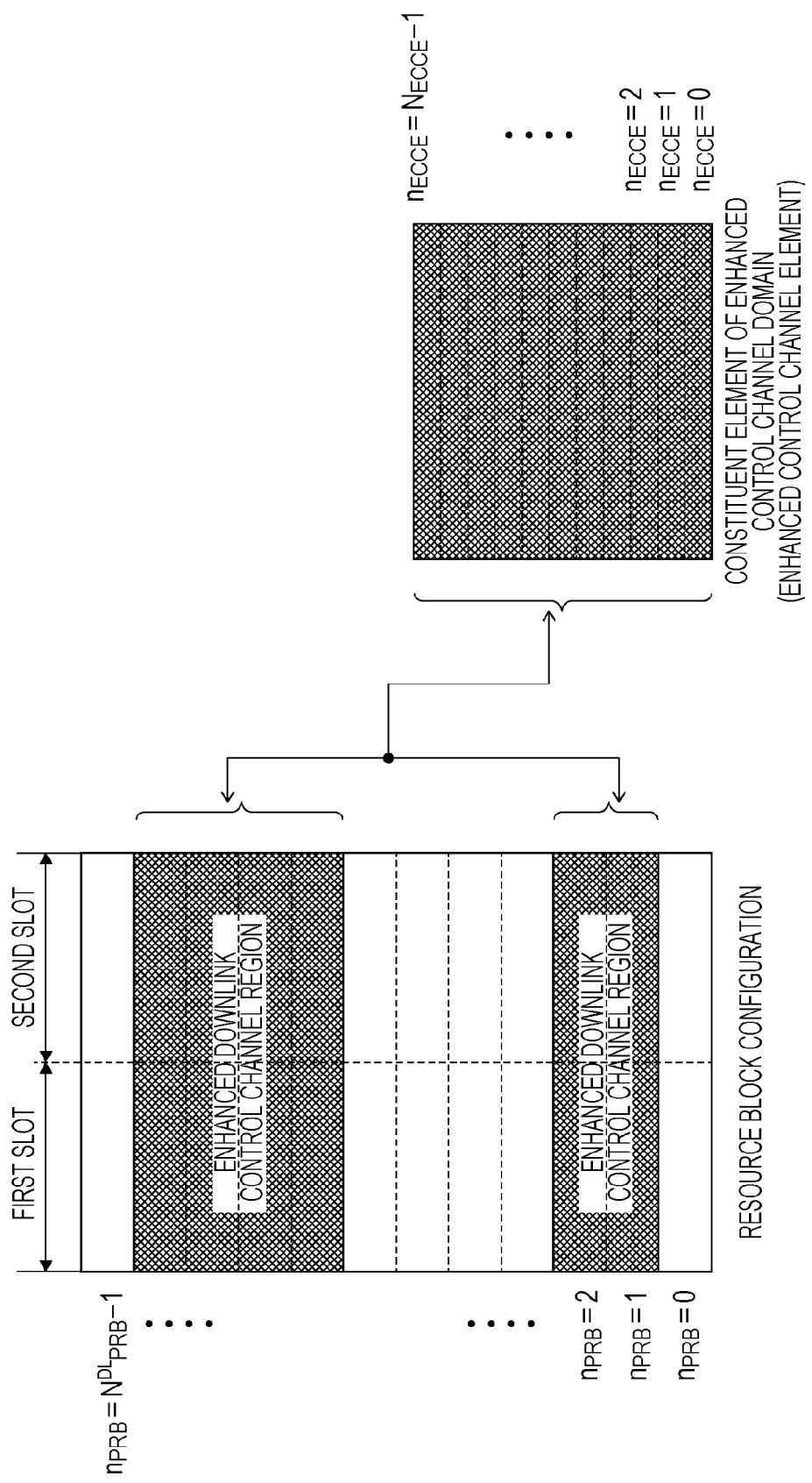
FIG. 11 is a diagram illustrating a constituent element of the EPDCCH according to the first embodiment.

FIG. 11 is a diagram illustrating one example of a constituent element within the EPDCCH region. The PRB pairs which are set to be in the EPDCCH region and of which the number is $N^{EPDCCH}_{PRB}$ are extracted from the PRB pairs of which the number is $N^{DL}_{PRB}$, and an Enhanced CCE (ECCE) that is a constituent element of the EPDCCH is mapped to the RE that constructs the EREG within the extracted domain. Here, it is preferable that the mapping uses methods that are different such that there are a case where the local mapping scheme is used and a case where the distributed mapping scheme is used. A number $n_{ECCE}$ is allocated to the ECCE that is a constituent element of the EPDCCH. For example, 0, 1, 2, and so forth up to $N_{ECCE}-1$ is established starting from a constituent element that has a low frequency. To be more precise, in the frequency domain, a set of PRBs of which the number is $N^{EPDCCH}_{PRB}$ is configured by high-level layer signaling (for example, signaling that is dedicated to the terminal or signaling that is common within the cell) for transmission of a potential EPDCCH, and constituent elements of the EPDCCH, of which the number is $N_{ECCE}$, are available for use.

Figure 12:
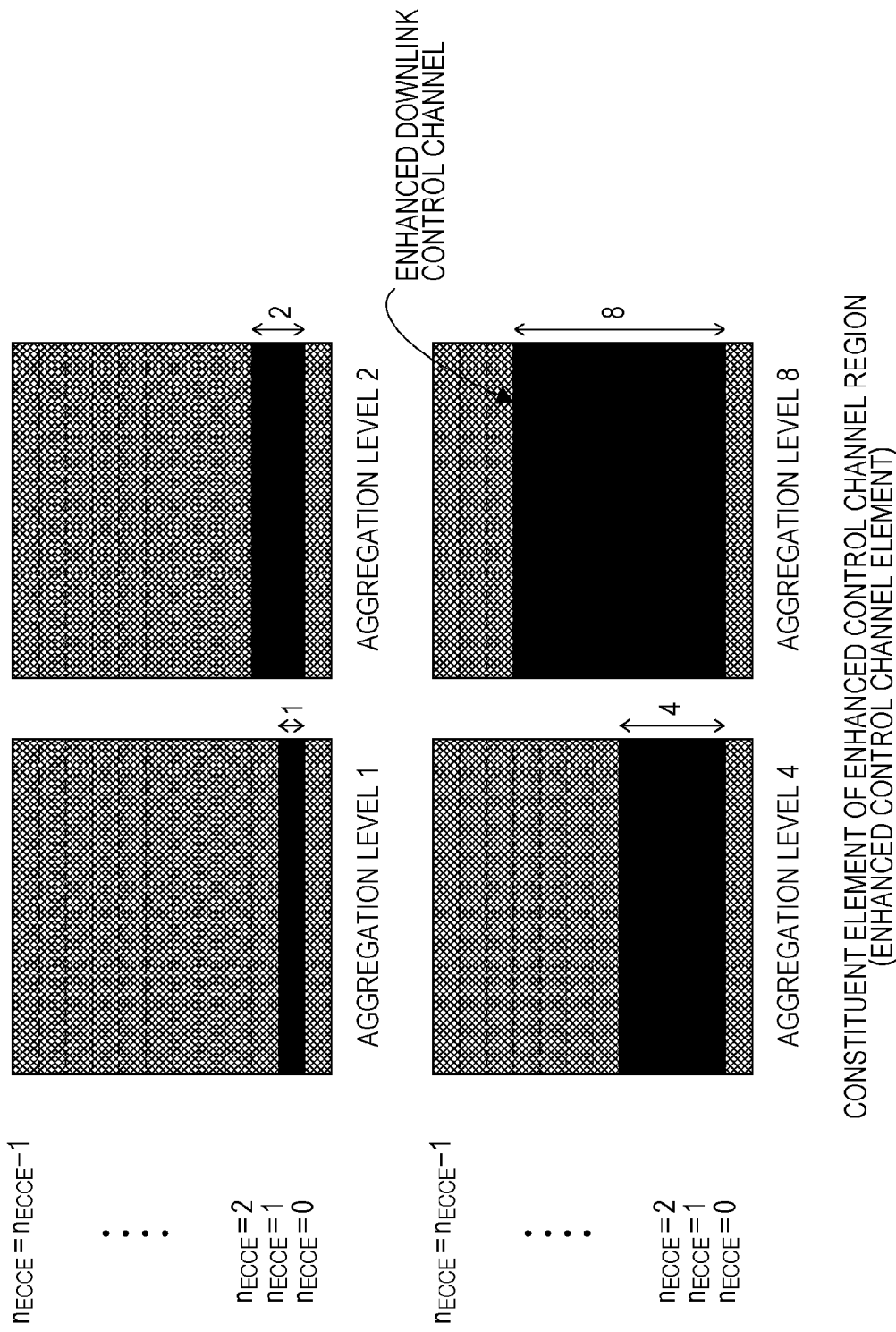
FIG. 12 is a diagram illustrating one example of an aggregation level according to the first embodiment.

FIG. 12 is a diagram illustrating an aggregation level in the EPDCCH. One EPDCCH is transmitted and received using one or more ECCE, indexes of which are consecutive. The number of ECCEs that are used for transmission and reception of one EPDCCH is the aggregation level. Here, a case where the aggregation levels are 1, 2, 4, and 8 is illustrated, but is not limited to this. In addition to these, the aggregation level can take 16 or 32. Generally, each of the ECCE is mapped to an individual EREG. For this reason, the higher the aggregation level, the greater the number of REs that are used for transmission and reception of one EPDCCH, and thus the transmission and reception at a low coding rate is possible. The base station 101 selects a suitable aggregation level in such a manner that an error rate of EPDCCH reception in the terminal 102 is a prescribed value or below. The terminal 102 sequentially attempts to perform the blind decoding for possible aggregation levels.

Figure 13:
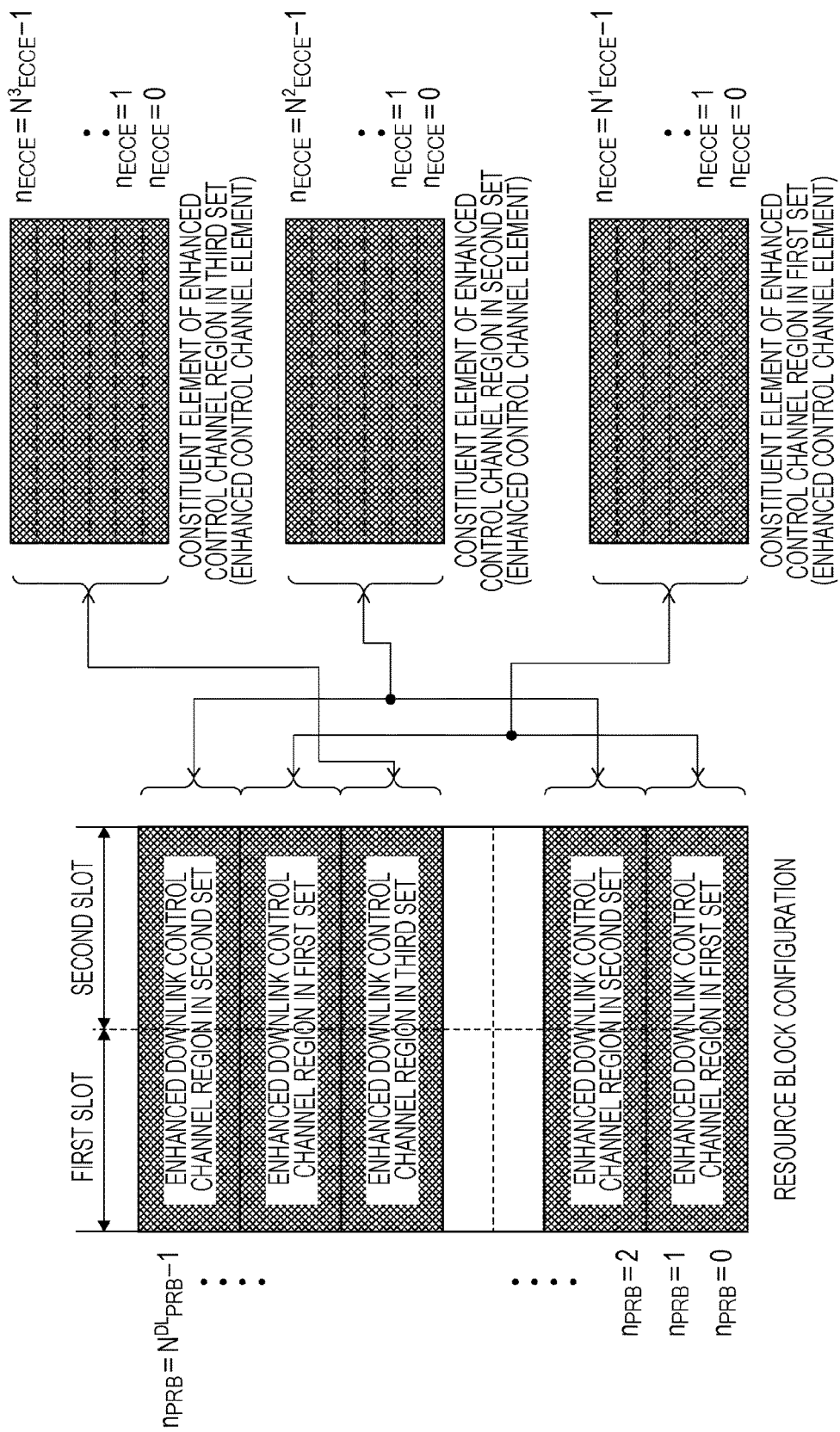
FIG. 13 is a diagram illustrating one example of an EPDCCH set according to the first embodiment.

FIG. 13 is a diagram illustrating one example of an EPDCCH set. Here, a case where, as an EPDCCH set (an EPDCCH-PRB set), three sets from a first set to a third set are set is illustrated, but this is only one example. The number of sets may be greater than 3. With the EPDCCH-PRB set, a parameter can be set individually (independently). As individual parameters, the following parameters from (1) to (9) and the like can be used.

(1) The number of PRB pairs that are included in the EPDCCH-PRB set (2) Which PRB pair is included in the EPDCCH-PRB set (3) Whether the mapping scheme is the localized mapping scheme or the distributed mapping scheme (4) A starting position of the EPDCCH (a number of the first OFDM symbol among the ODFM symbols to which the EPDCCH is mapped)

(5) Information relating to a position of the CRS that is considered when the EPDCCH is mapped to the RE (the number of CRS ports, a position of the frequency domain of the CRS, or a position of an MBSFN subframe)

(6) Information relating to a position of zero power CSIRS (Zero Power-CSIRS (ZP-CSIRS)) that is considered when the EPDCCH is mapped to the RE (a position of a ZP-CSIRS subframe or a position of the RE of the ZP-CSIRS within a subframe)

(7) Information relating to the RS or the synchronization signal that can be regarded as (is pseudo-collocated) as being transmitted from the same transmission point as the DMRS that is transmitted at the same transmission port as the EPDCCH (for example, information indicating an index of a non-zero power CSIRS (Non Zero Power-CSIRS (NZP-CSIRS)) resource or an enhanced synchronization signal, or the like)

(8) An offset value of a starting position of the PUCCH resource (a resource for PUCCH formats 1a and 1b) for transmitting the HARQ response information on the PDSCH that is given an assignment instruction with the EPDCCH (9) information relating to an initial value of a pseudo random sequence in the DMRS that is transmitted at the same transmission port as the EPDCCH For this reason, the number of ECCEs that correspond to the EPDCCH-PRB set is also an individual value for every set. Here, the numbers of ECCEs that can be mapped to 3 sets from the first to the third set are set to be $N^1_{ECCE}$, $N^2_{ECCE}$, and $N^3_{ECCE}$, respectively.

Furthermore, among multiple EPDCCH-PRB sets, with at least one EPDCCH-PRB set (which is the first set here), the terminal 102 can acquire the parameters described above before RRC connection establishment (or before a target cell is set to be a serving cell). On the other hand, with the remaining EPDCCH-PRB sets (which are the second set and later), the terminal 102 can acquire the parameters described above through dedicated RRC signaling after the RRC connection establishment (or after the target cell is set to be the serving cell). Here, as examples of a method of acquiring the parameters described above before the RRC connection establishment, the following methods from (A) to (C) and the like can be used.

(A) The base station 101 transmits prescribed information over a physical broadcast channel. The terminal 102 receives the physical broadcast channel and then determines (calculates) a parameter based on prescribed information. The determined parameter is set. Here, the prescribed information may be information indicating the parameter itself. Alternatively, although the prescribed information is not the parameter itself, a method of uniquely determining a parameter from the prescribed information may be specified in advance.

(B) The base station 101 transmits a synchronization signal that corresponds to a cell identifier (a physical cell identifier). The terminal 102 receives the synchronization signal and then determines (calculates) a parameter based on the cell identifier. The determined parameter is set. A method of uniquely determining a parameter from the cell identifier may be specified in advance.

(C) A parameter that is common to the base station 101 and the terminal 102 is preset. In other words, a fixed parameter is set according to system specifications.

Moreover, an individual method can be used for every parameter.

As a desirable specific example of a method of acquiring the parameter described above before the RRC connection establishment, the following method from (D) to (H) and the like can be used.

(D) The DMRS that is transmitted at the same transmission port as the EPDCCH, and the CRS or the enhanced synchronization signal in the serving cell are regarded as being transmitted from the same transmission point.

(E) In the DMRS that is transmitted at the same transmission port as the EPDCCH, initialization of the pseudo random sequence is based on the cell identifier in the serving cell. Moreover, preferably, the synchronization signal is generated by the base station 101 based on the cell identifier in the serving cell, and the terminal 102 acquires the cell identifier in the serving cell based on the synchronization signal.

(F) As the position of the CRS that is considered when the EPDCCH is mapped to the RE, a position of the CRS in the serving cell (a position that is based on the CRS which is transmitted together with the physical broadcast channel in the serving cell) or a position of the enhanced synchronization signal is used. Moreover, the position of the enhanced synchronization signal also includes a position of a subframe in which the enhanced synchronization signal is inserted.

(G) The distributed mapping scheme is always used.

(H) Without the zero power CSIRS, the mapping of the EPDCCH to the RE is performed. Alternatively, the mapping is performed in such a manner that all the REs to which the zero power CSIRS is mapped are avoided.

Accordingly, transmission and reception of important information, such as paging information or a random access response, is possible in the serving cell and/or the subframe that is at least not in a poor communication state.

Moreover, the EPDCCH-PRB set with which the parameter described above before the RRC connection establishment can be acquired is referred to as a first EPDCCH-PRB set, and an EPDCCH-PRB set other than the first EPDCCH-PRB set is referred to as a second EPDCCH-PRB set. Here, the SS within the first EPDCCH-PRB set can be set to be the CSS in which the EPDCCH is arrangeable, and the SS within the second EPDCCH-PRB set can be set to be the USS in which the EPDCCH is arrangeable. Alternatively, for distinction, the SS within the first EPDCCH-PRB set may be referred to as a primary USS, and the SS within the second EPDCCH-PRB set may be referred to as a secondary USS. The EPDCCH to (in) which the control information, such as the system information or the information relating the paging, that the multiple terminals 102 read is assigned (included), or the EPDCCH to which the downlink/uplink grant indicating an instruction for fallback to or random access to the low-level transmission scheme is assigned (included) can be arranged in the CSS to which the EPDCCH is arrangeable or the primary USS. On the other hand, these EPDCCHs are not arranged in a normal USS or the secondary USS. More specifically, the EPDCCH to which the CRC that is scrambled by the system information identifier, the paging identifier, the random access identifier, or the transmission power control identifier is added is arrangeable in the CSS or the primary USS. On the other hand, the EPDCCH to which the CRS that is scrambled by one of these identifiers is added cannot be arranged in the normal USS or the secondary USS. Moreover, one of these identifiers is an identifier that is assigned to one or more terminals (or multiple terminals), and one or more terminals (or multiple terminals) may perform the reception processing on the PDSCH to which the CRC that is scrambled by one of these identifiers is added.

Figure 14:
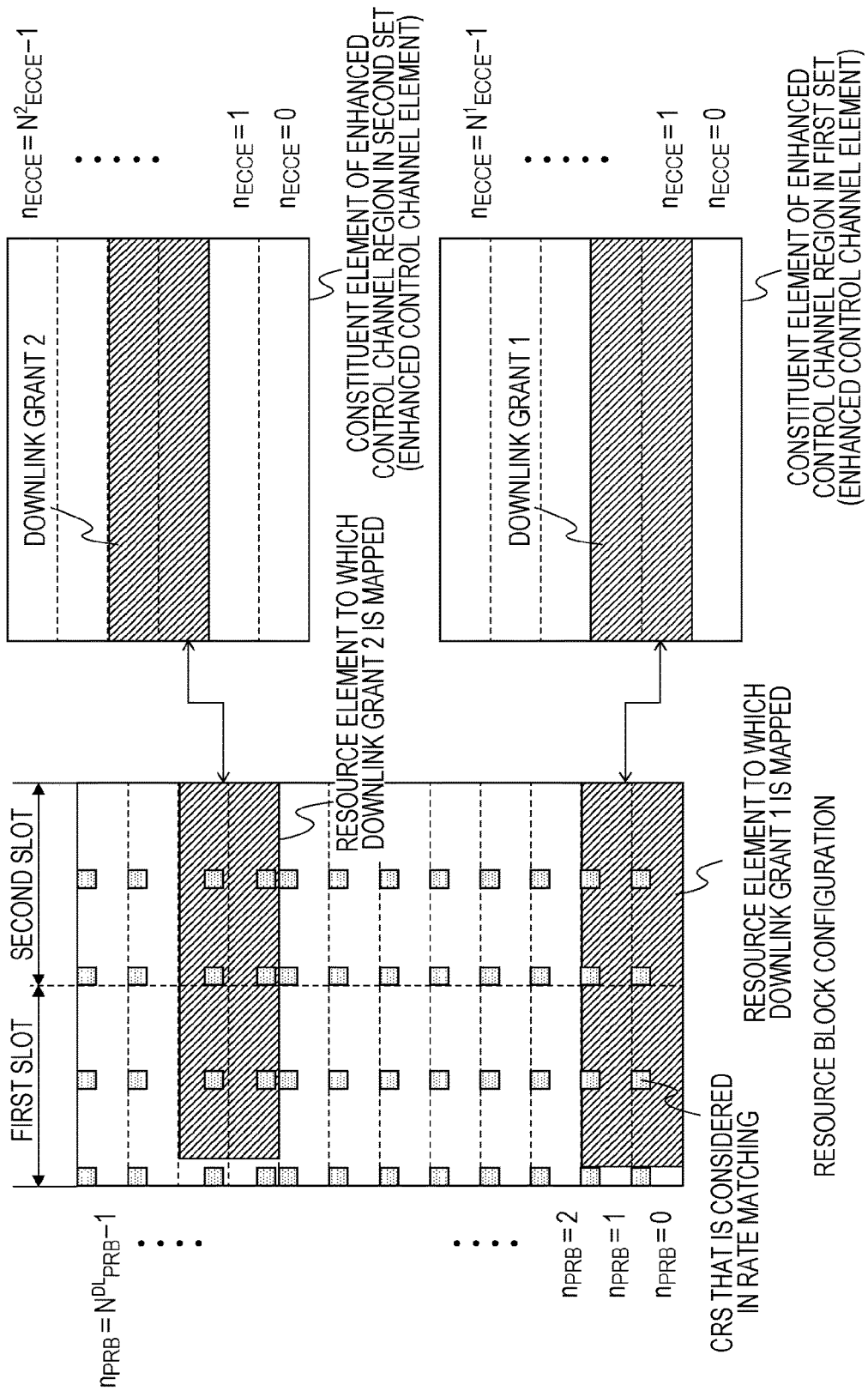
FIG. 14 is a diagram illustrating one example of downlink grant and a CRS that is considered in rate matching according to the first embodiment.

Next, a method of transmitting and receiving the EPDCCH for transmitting and receiving the downlink grant is described. FIG. 14 is a diagram illustrating one example of the downlink grant and the CRS that is considered in rate matching. When the downlink grant is detected with the SS in the first set, the terminal 102 is set to perform the rate matching considering the RE for a prescribed CRS (the PDSCH is set not to be mapped to the RE for the prescribed CRS). Conversely, when the EPDCC including the downlink grant is arranged in the first set, the base station 101 performs the rate matching considering the RE for the prescribed CRS (the PDSCH is not mapped to the RE for the predetermined CRS). As one example of the prescribed CRS in the first set, a case where the position of the RE for the CRS of the serving cell is used is described here. Although the base station 101 does not notify the terminal 102 of the position of the CRS of the serving cell via dedicated signaling, the terminal 102 can know the position of the CRS of the serving cell. On the other hand, when the downlink grant is detected with the SS in the second set, the terminal 102 is set to perform the rate matching considering the RE for the CRS that is indicated from the base station 101 (the PDSCH is set not to be mapped to the RE for the CRS that is indicated from the base station 101). Conversely, when the EPDCC including the downlink grant is arranged in the second set, the base station 101 indicates the position of the CRS that is to be considered in the rate matching, and performs the rate matching considering the RE for the indicated CRS (the PDSCH is not mapped to the RE for the indicated CRS). As one example of the prescribed CRS in the second set, a case where the position of the RE for the CRS of the neighboring cell is used is described here. For the indication of the position of the CRS, a method may be satisfactory in which multiple candidates are configured with individual RRC signaling from the base station 101 to the terminal 102 and information for associating one among the multiple candidates with EPDCCH transmission is further configured with the individual RRC signaling. Moreover, the information relating to the position of the CRS may be constructed from the number of CRS ports, the position of the frequency domain of the CRS, and the position of the MBSFN subframe. In this case, the position of the RE within the subframe is uniquely determined from the number of CRS ports and the position of the frequency domain of the CRS. Furthermore, all the positions of the RE within the subframe, which are determined from the number of CRS ports and the position of the frequency domain of the CRS, are considered in other than the MBSFN subframe, but in the MBSFN subframe, only the position of the RE in several front ODFM symbols is considered among the positions of the RE within the subframe, which are determined from the number of CRS ports and the position of the frequency domain of the CRS.

Figure 15:
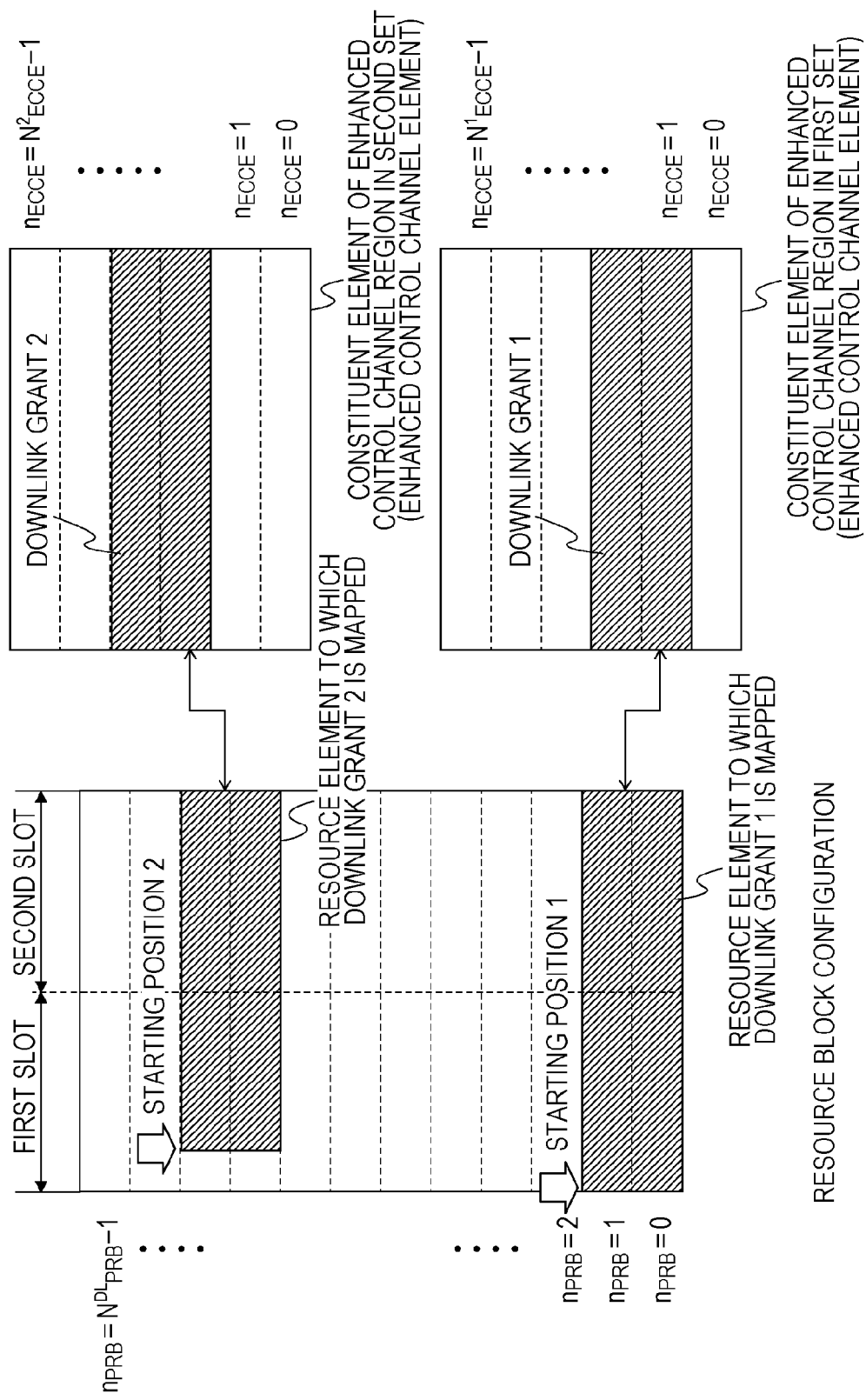
FIG. 15 is a diagram illustrating one example of the downlink grant and a starting position of an EPDCCH according to the first embodiment.

FIG. 15 is a diagram illustrating one example of the downlink grant and a starting position of the EPDCCH. When the downlink grant is detected with the SS in the first set, the terminal 102 is set to perform the rate matching in such a manner that the PDSCH is mapped from a prescribed starting position. Conversely, when the EPDCCH including the downlink grant is arranged in the first set, the base station 101 performs the rate matching in such a manner that the PDSCH is mapped from the prescribed starting position. As one example of the prescribed starting position in the first set, a case of a front symbol in the subframe is described here. Although the base station 101 does not notify the terminal 102 of the front symbol in the subframe through dedicate signaling, the terminal 102 can know the front symbol in the subframe. On the other hand, when the downlink grant is detected with the SS in the second set, the terminal 102 is set to perform the rate matching in such a manner that the PDSCH is mapped from a starting position that is indicated by the base station 101. Conversely, when the EPDCCH including the downlink grant is arranged in the second set, the base station 101 indicates the starting position that is to be considered in the rate matching and performs the rate matching in such a manner that the PDSCH is mapped from the indicated starting position. As one example of the prescribed CRS in the second set, a case where the starting position in the neighboring cell is used is described here. A method of setting the starting position with the individual RRC signaling from the base station 101 to the terminal 102 may be satisfactory.

Figure 16:
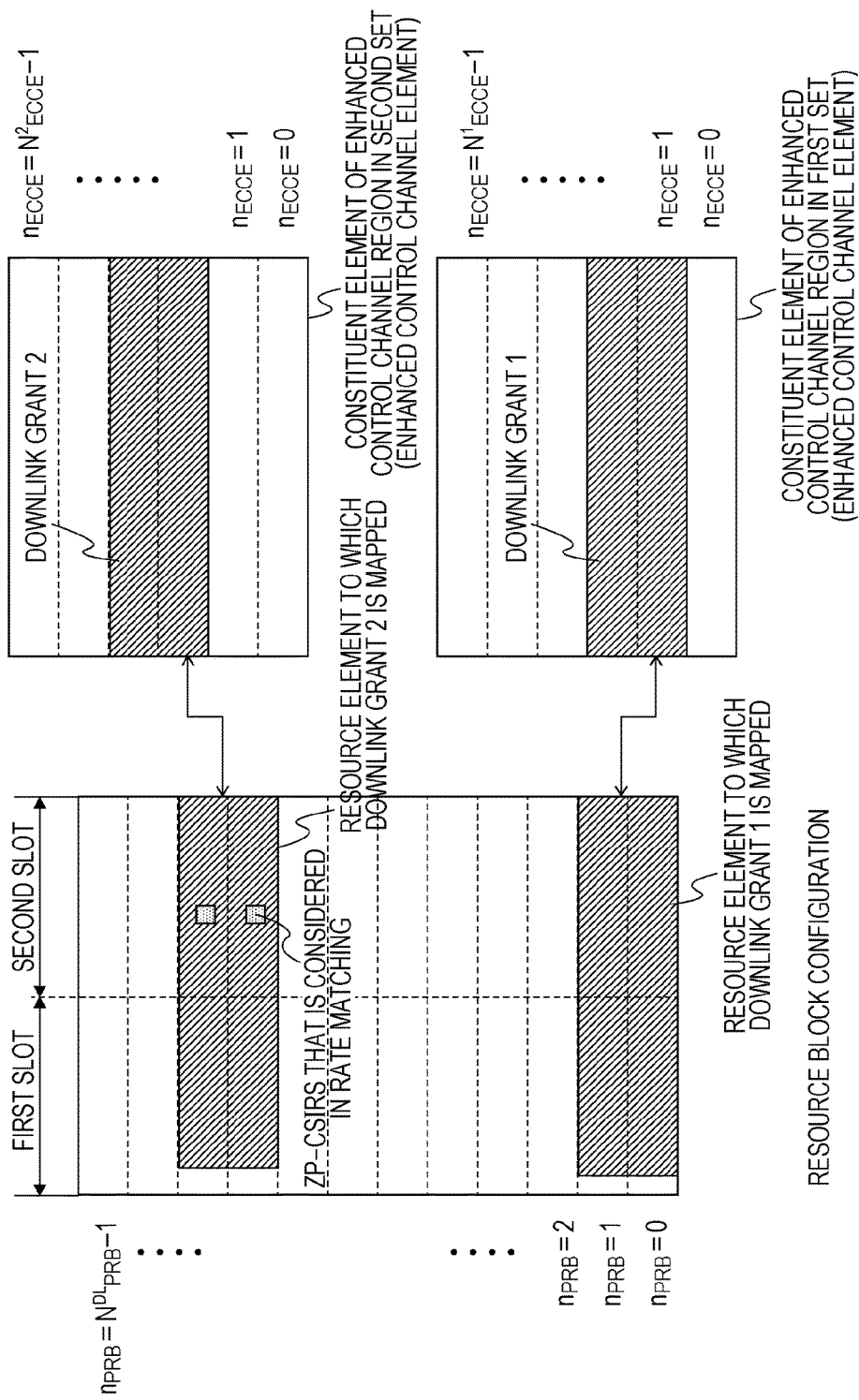
FIG. 16 is a diagram illustrating one example of the downlink grant and a ZP-CSIRS that is considered in rate matching according to the first embodiment.

FIG. 16 is a diagram illustrating one example of the downlink grant and the ZP-CSIRS that is considered in the rate matching. When the downlink grant is detected with the SS in the first set, the terminal 102 is set to perform the rate matching considering the RE for a prescribed ZP-CSIRS (the PDSCH is set not to be mapped to the RE for the prescribed ZP-CSIRS). Conversely, when the EPDCCH including the downlink grant is arranged in the first set, the base station 101 performs the rate matching considering the RE for the prescribed ZP-CSIRS (the PDSCH is not mapped to the RE for the predetermined ZP-CSIRS). As one example of the prescribed ZP-CSIRS in the first set, a case where no ZP-CSIRS is considered is described here. In the case where no ZP-CSIRS is considered, there is no need for the base station 101 to notify the terminal 102 via the dedicated signaling. On the other hand, when the downlink grant is detected with the SS in the second set, the terminal 102 is set to perform the rate matching considering the RE for the ZP-CSIRS that is indicated from the base station 101 (the PDSCH is set not to be mapped to the RE for the ZP-CSIRS that is indicated from the base station 101). Conversely, when the EPDCCH including the downlink grant is arranged in the second set, the base station 101 indicates the position of the ZP-CSIRS that is to be considered in the rate matching, and performs the rate matching considering the RE for the indicated ZP-CSIRS (the PDSCH is not mapped to the RE for the indicated ZP-CSIRS). As one example of the prescribed ZP-CSIRS in the second set, a case where the position of the RE for the ZP-CSIRS of the neighboring cell is used is described here. For the indication of the position of the ZP-CSIRS, a method may be satisfactory in which multiple candidates are set with individual RRC signaling from the base station 101 to the terminal 102 and information for associating one among the multiple candidates with EPDCCH transmission is further set with the individual RRC signaling.

Figure 17:
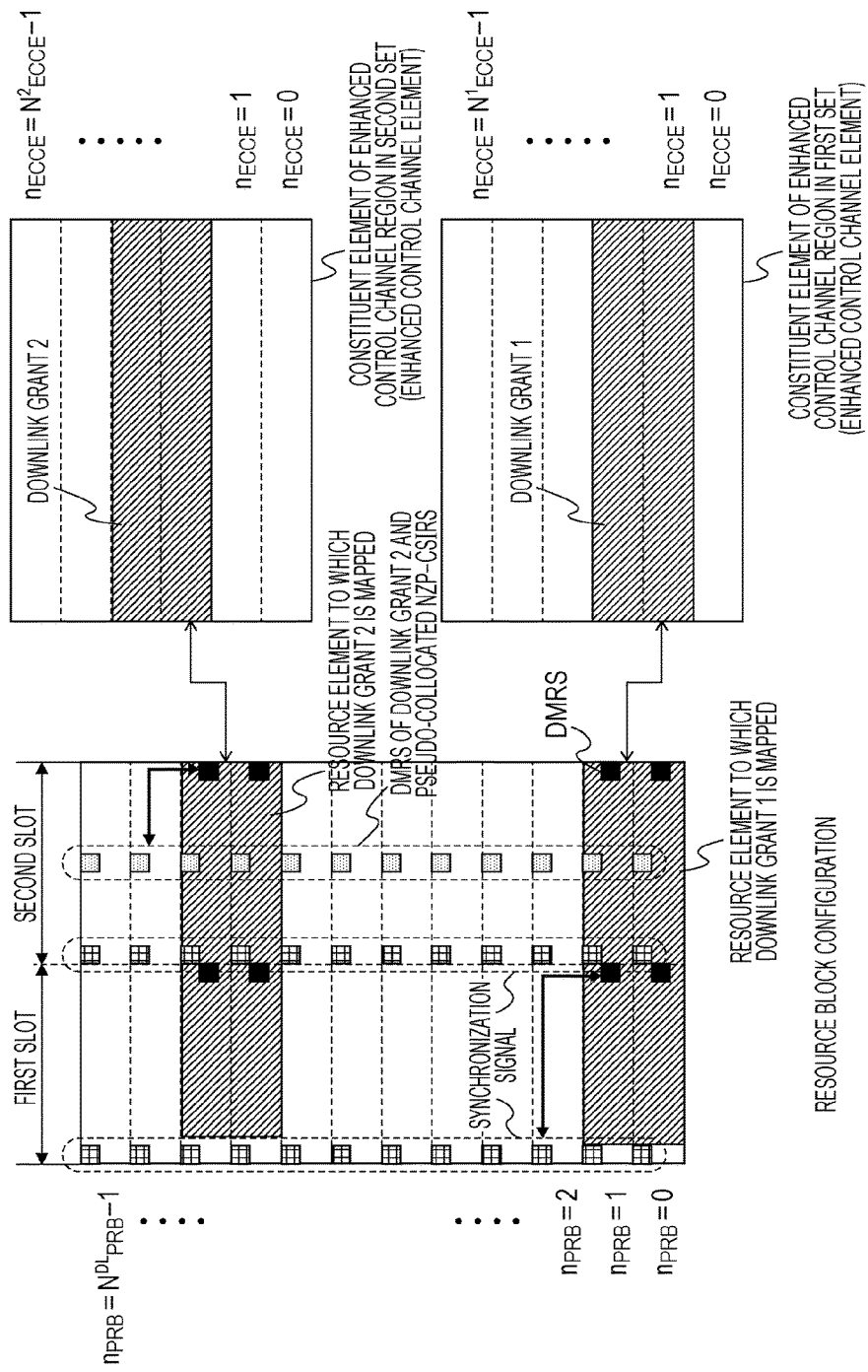
FIG. 17 is a diagram illustrating one example of the downlink grant and DMRS pseudo collocation according to the first embodiment.

FIG. 17 is a diagram illustrating one example of the downlink grant and DMRS pseudo collocation. When the downlink grant is detected with the SS in the first set, the terminal 102 sets the DMRS to be pseudo-collocated with a prescribed signal (performs reception processing at the same timing as with the prescribed signal). Conversely, when the EPDCCH including the downlink grant is arranged in the first set, the base station 101 transmits the DMRS in such a manner that the DMRS is pseudo-collocated with the prescribed signal (transmits the DMRS from the transmission point in such a manner that the terminal 102 receives the DMRS at the same timing as with the prescribed signal). As one example of the prescribed signal in the first set, a synchronization signal (for example, an enhanced synchronization signal) is described here. Although the base station 101 does not notify the terminal 102 of a position of the enhanced synchronization signal via dedicated signaling, the terminal 102 can know the position thereof. On the other hand, when the downlink grant is detected with the SS in the second set, the terminal 102 sets the DMRS to be pseudo-collocated with the NZP-CSIRS that is indicated from the base station 101 (performs the reception processing at the same timing as with the ZP-CSIRS that is indicated from the base station 101). Conversely, when the EPDCCH including the downlink grant is arranged in the second set, the base station 101 indicates an index of the NZP-CSIRS and transmits the DMRS in such a manner that the DMRS is pseudo-collocated with the indicated NZP-CSIRS. As one example of the prescribed ZP-CSIRS in the second set, a case where the NZP-CSIRS in the neighboring cell is used is described here. For the indication of the index of the NZP-CSIRS, the method may be satisfactory in which multiple candidates are set with the individual RRC signaling from the base station 101 to the terminal 102 and the information for associating one among the multiple candidates with EPDCCH transmission is further set with the individual RRC signaling.

Figure 18:
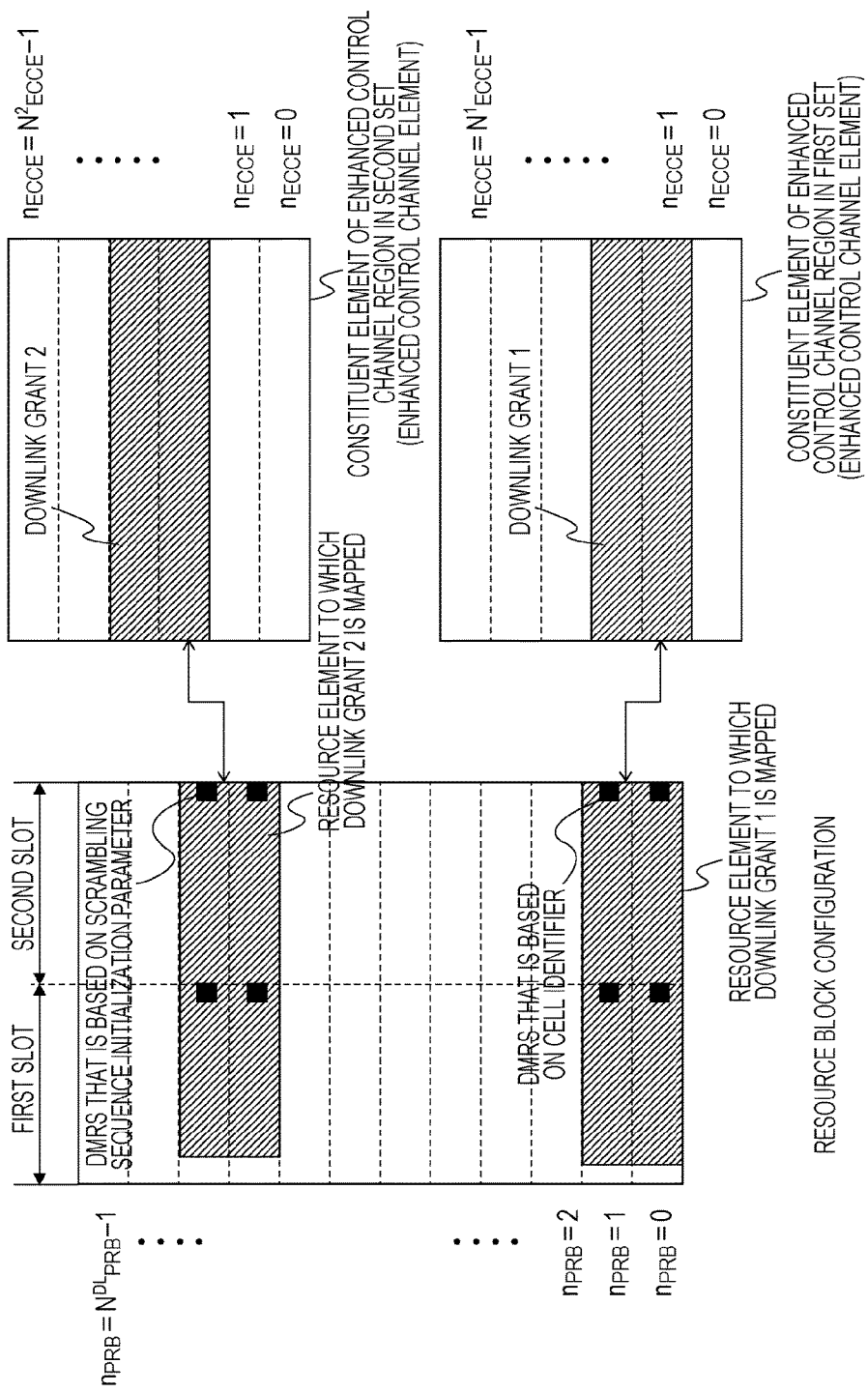
FIG. 18 is a diagram illustrating one example of the downlink grant and a DMRS scrambling sequence according to the first embodiment.

FIG. 18 is a diagram illustrating one example of the downlink grant and a DMRS scrambling sequence. When the downlink grant is detected with the SS in the first set, the terminal 102 sets the DMRS to be based on a prescribed scrambling sequence. Conversely, when the EPDCCH including the downlink grant is arranged in the first set, the base station 101 generates the DMRS based on the prescribed scrambling sequence. As one example of the prescribed scrambling sequence in the first set, a pseudo random sequence that is initialized using the cell identifier of the serving cell is described here. Although the base station 101 does not notify the terminal 102 of the cell identifier via dedicated signaling, the terminal 102 can know a value thereof. On the other hand, when the downlink grant is detected with the SS in the second set, the terminal 102 sets the DMRS to be based on the scrambling sequence that is indicated from the base station 101 (The pseudo random sequence is set to be initialized with a parameter that is indicated by the base station 101). Conversely, when the EPDCCH including the downlink grant is arranged in the second set, the base station 101 indicates a scrambling sequence initialization parameter and generates the DMRS based on the indicated scrambling sequence initialization parameter. As one example of the scrambling sequence initialization parameter in the second set, a case where the cell identifier of the neighboring cell is used is described here. For the indication of the scrambling sequence initialization parameter, a method of setting the scrambling sequence initialization parameter with the individual RRC signaling from the base station 101 to the terminal 102 may be satisfactory.

Figure 19:
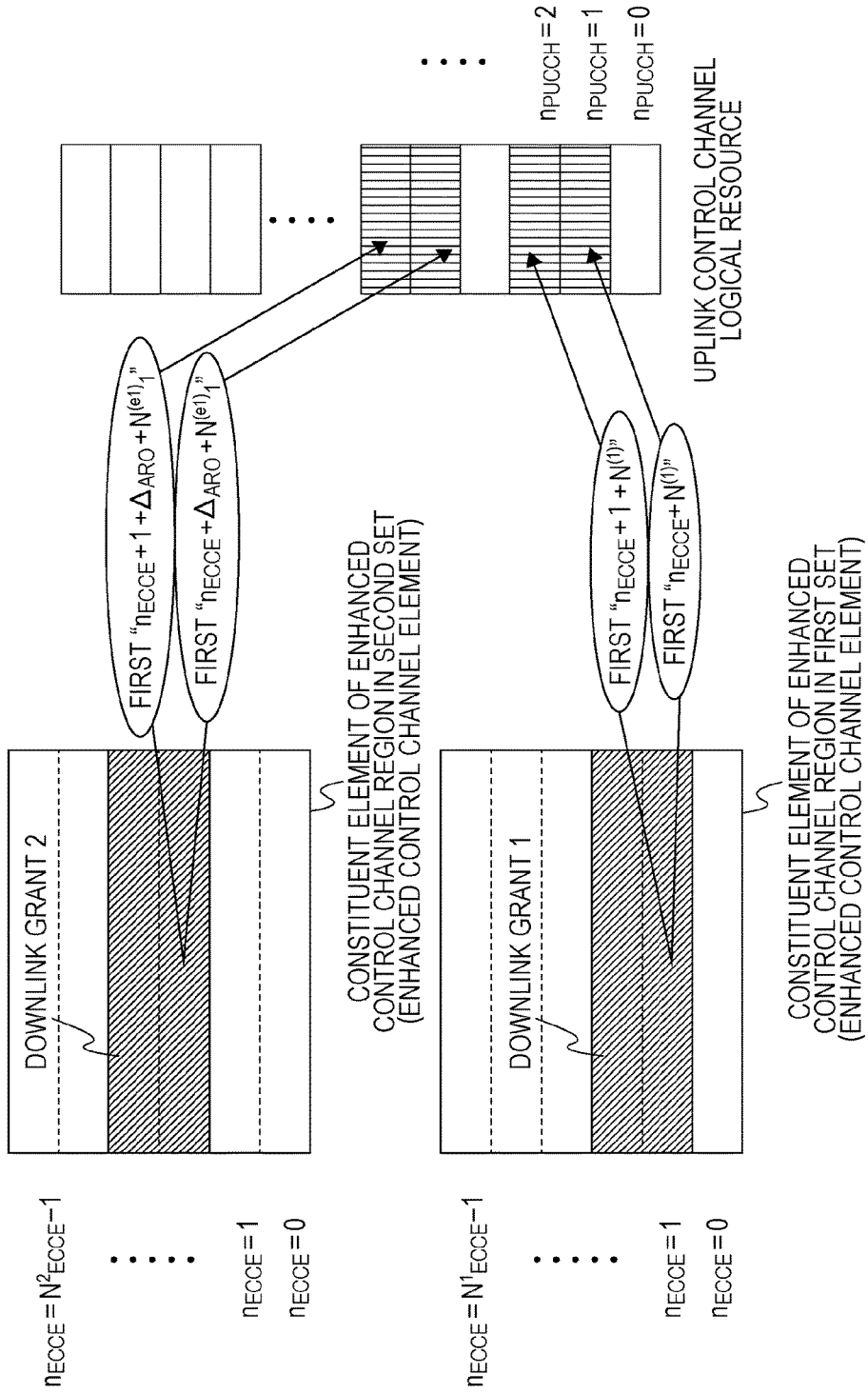
FIG. 19 is a diagram illustrating one example of assignment of a downlink grant and a PUCCH resource according to the first embodiment.

Next, assignment of the downlink grant and the PUCCH resource is described. FIG. 19 is a diagram illustrating one example of the assignment of the downlink grant and the PUCCH resource. When the downlink grant is detected with the SS in the first set, the terminal 102 reports the HARQ response information on the downlink transmission data (the PDSCH) corresponding to the downlink grant, using the PUCCH resource in accordance with the ECCE number of the ECCE that has the smallest ECCE number, among the ECCEs that construct the EPDCCH including the downlink grant. Conversely, when the EPDCCH including the downlink grant is arranged in the first set, the base station 101 sets the EPDCCH to be arranged in the ECCE that corresponds to the PUCCH resource with which the terminal 102 reports the HARQ response information on the downlink transmission data (the PDSCH) that corresponds to the downlink grant. Furthermore, the base station 101 receives the HARQ response information that corresponds to the PDSCH that is transmitted to the terminal 102, through the PUCCH that is scheduled in advance. More specifically, as illustrated in FIG. 19, the PUCCH resource that has an index $n_{PUCCH}$ that is consistent with a value that results from adding $N^{(1)}$ (which can be expressed as $N^{(e1)}$) that is a starting position offset which is configured for the first set, to the ECCE number $n_{ECCE}$ of the first ECCE, among the ECCEs that construct the EPDCCH including the downlink grant, is the PUCCH resource that is assigned to the HARQ response information on the downlink transmission data that corresponds to the downlink grant.

On the other hand, when the downlink grant is detected with the SS in the second set, the terminal 102 reports the HARQ response information on the downlink transmission data (the PDSCH) corresponding to the downlink grant, using the PUCCH resource in accordance with the ECCE number of the ECCE that has the smallest ECCE number, among the ECCEs that construct the EPDCCH including the downlink grant. Conversely, when the EPDCCH including the downlink grant is arranged in the second set, the base station 102 is set to arrange the EPDCCH in the ECCE that corresponds to the PUCCH resource with which the terminal 102 reports the HARQ response information on the downlink transmission data (the PDSCH) which corresponds to the downlink grant. Furthermore, the base station 101 receives the HARQ response information that corresponds to the PDSCH that is transmitted to the terminal 102, through the PUCCH that is scheduled in advance. More specifically, as illustrated in FIG. 14, the PUCCH resource that has the index $n_{PUCCH}$ that is consistent with a value that results from adding an offset value $\Delta_{ARO}$ that is indicated dynamically in a HARQ-ACK Resource Offset (ARO) field in the EPDCCH, and $N^{(e1)}{}_1$ that is the starting position offset which is configured for the second set, to the ECCE number $n_{ECCE}$ of the first ECCE, among the ECCEs that construct the EPDCCH including the downlink grant, is the PUCCH resource that is assigned to the HARQ response information on the downlink transmission data that corresponds to the downlink grant. Moreover, although not described here, in a case where the EPDCCH is transmitted and is received in a (k+1)-th set (a third set or later), in the same manner, $N^{(e1)}{}_k$ that is the starting position offset that is set for the (k+1)-th set may be used.

As illustrated in FIG. 14, in a case where the EPDCCH is transmitted and received in a first EPDCCH-PRB set, the offset value in the ARO field is not used for calculation of the PUCCH resource, and in a case where the EPDCCH is transmitted and received in a second EPDCCH-PRB set, the offset value in the ARO field can be used for the calculation of the PUCCH resource. Accordingly, scheduling of the PUCCH resource that corresponds to the EPDCCH in the first EPDCCH-PRB set can be simplified. At this time, the EPDCCH that is transmitted and received in the first EPDCCH-PRB set also can be set to have a configuration that does not include the ARO field, and the ARO field in the EPDCCH that is transmitted and received in the first EPDCCH-PRB set also can be set to always have a fixed bit (for example, all fields are set to have a zero).

Alternatively, even in a case where the EPDCCH is transmitted and received in the first EPDCCH-PRB set, in the same manner as with the case where the EPDCCH is transmitted and received in the second EPDCCH-PRB set, the offset value in the ARO field can be used for the calculation of the PUCCH resource. Accordingly, the PUCCH resource that corresponds to the EPDCCH in the first EPDCCH-PRB set can be scheduled with high degree of freedom.

Furthermore, for example, there can be a case where multiple PUCCH resources are necessary corresponding to one EPDCCH, such as a case where because the downlink transmission data that corresponds to the downlink grant includes two or more codewords, two pieces of HARQ response information themselves are present or a case where one piece of response information is diversity-transmitted using multiple PUCCH resources. At this time, in addition to a PUCCH resource in accordance with the ECCE number of the ECCE that has the smallest ECCE number, among the ECCEs that construct the EPDCCH including the downlink grant, the PUCCH resource that is greater by one index than the PUCCH resource can be used.

Figure 20:
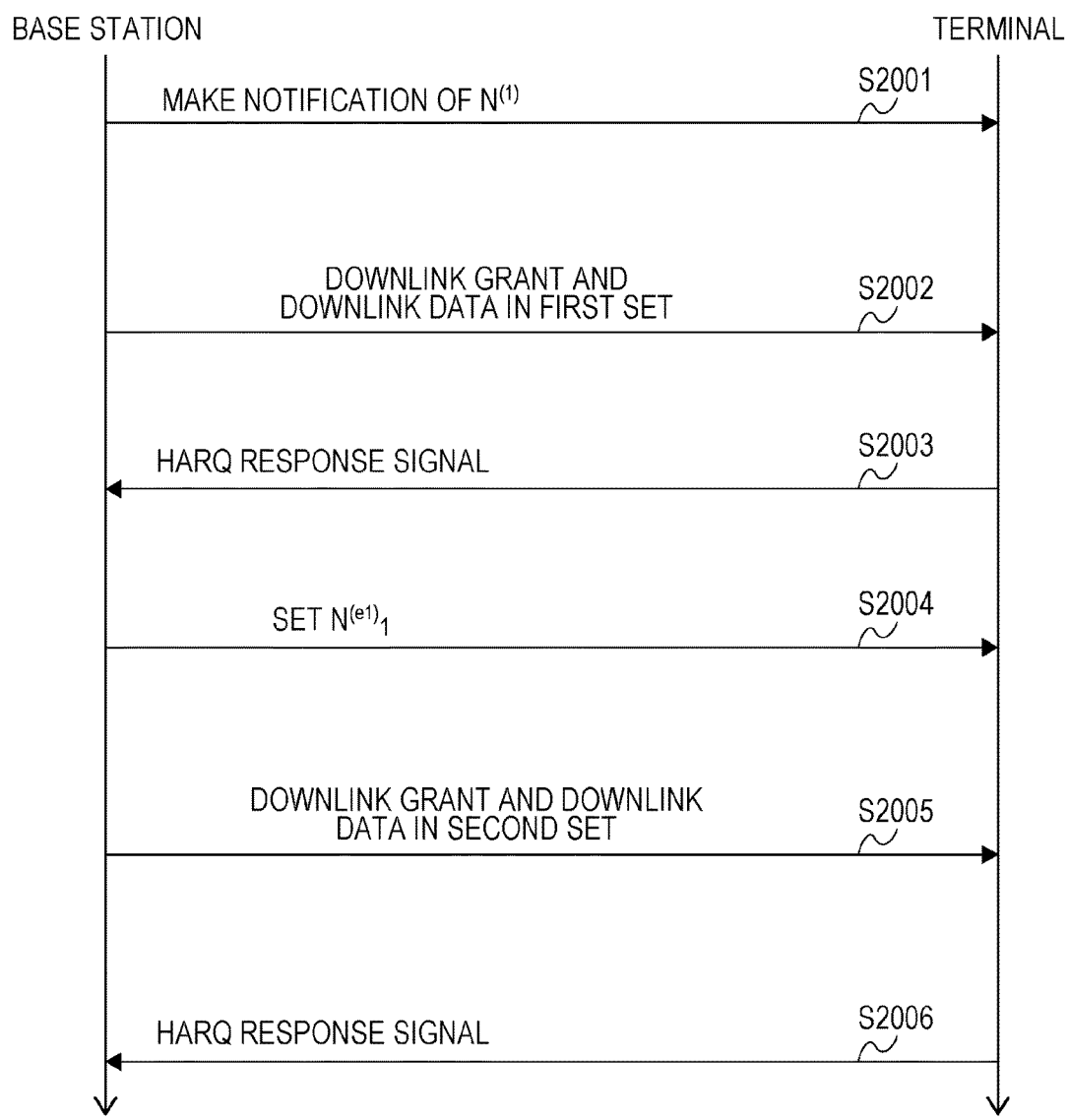
FIG. 20 is a diagram illustrating one example of a flow for downlink data transmission and for a response procedure for the downlink data transmission according to the first embodiment.
Figure 23:
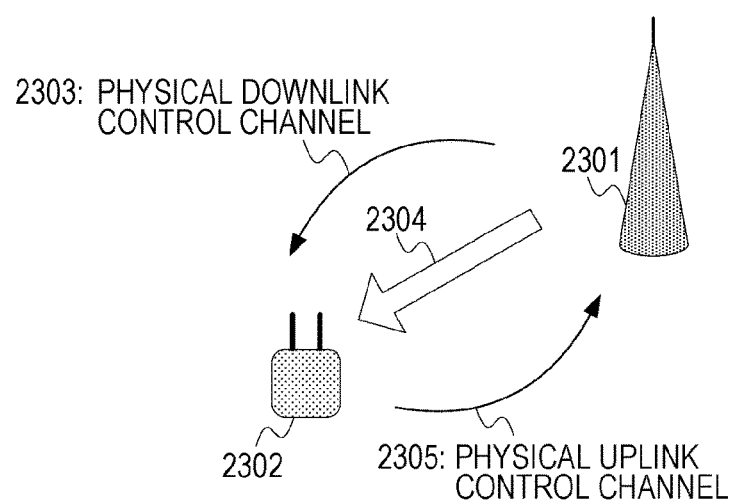
FIG. 23 is a diagram illustrating a configuration example of the communication system.

FIG. 20 is a diagram illustrating one example of a flow for downlink data transmission between the base station 101 and the terminal 102 and for a response procedure for the downlink data transmission. The base station 101 broadcasts the system information including $N^{(1)}$ that corresponds to the first set, using a broadcast channel, and the terminal 102 acquires the system information (Step S2001). $N^{(1)}$ indicates an amount of common shift that is set to be common to all the terminals. Furthermore, the system information may include a parameter relating to the first EPDCCH-PRB set described above. Moreover, here, an example in which the base station 101 broadcasts $N^{(1)}$ or the parameter relating to the first EPDCCH-PRB set is described, but this does not impose any limitation. Even when $N^{(1)}$ is sent through individual signaling (RRC signaling) that is intended for each terminal 102, the same effect can be obtained.

Next, the base station 101 transmits the downlink grant to the terminal 102, using the EPDCCH that is arranged in the SS within the first set, and transmits the downlink transmission data that corresponds to the downlink grant, to the terminal 102, and the terminal 102 receives the downlink grant and the downlink transmission data (Step S2002). Furthermore, the terminal 102 that receives the downlink transmission data generates the HARQ response information. At this time, the base station 101 transmits the EPDCCH using the parameter relating to the first EPDCCH-PRB set that is included in the system information, and the terminal 102 receives the EPDCCH using the parameter relating to the first EPDCCH-PRB set that is included in the system information.

The terminal 102 determines the PUCCH resource based on $N^{(1)}$ that is acquired in Step S2001 and on information on the EPDCCH resource that is detected in Step S2002, and reports the HARQ response information using the determined PUCCH resource (Step S2003).

On the other hand, before transmitting and receiving the EPDCCH in the second set, the base station 101 notifies the terminal 102 of the control information for indicating (configuring or notifying of) $N^{(e1)}{}_1$ corresponding to the second set, using the individual RRC signaling, and the terminal 102 sets $N^{(e1)}{}_1$ based on the control information (Step S2004). $N^{(e1)}{}_1$ indicates an amount of individual shift that is configured individually for every terminal 102. Furthermore, in Step S2004, the base station 101 notifies the terminal 102 of the control information for indicating (configuring or notifying of) a parameter relating to the second EPDCCH-PRB set, and the terminal 102 can set these parameters based on the control information.

Next, the base station 101 transmits the downlink grant to the terminal 102 and transmits the downlink transmission data corresponding to the downlink grant to the terminal 102, using the EPDCCH that is arranged in the SS within the second set, and the terminal 102 receives the downlink grant and the downlink transmission data (Step S2005). At this time, the terminal 102 acquires the offset value that is indicated by the ARO field within the EPDCCH. Furthermore, the terminal 102 that receives the downlink transmission data generates the HARQ response information. At this time, the base station 101 transmits the EPDCCH using the parameter relating to the second EPDCCH-PRB set that is configured using individual RRC signaling, and the terminal 102 receives the EPDCCH using the parameter relating to the second EPDCCH-PRB configured that is set using the individual RRC signaling.

The terminal 102 determines the PUCCH resource based on $N^{(e1)}{}_1$ that is acquired in Step S2004, the information on the EPDCCH resource that is detected in Step S2005, and the offset value that is acquired in Step S2005, and reports the HARQ response information using the determined PUCCH resource (Step S2006). Moreover, one example of a correspondence between the ARO field and the offset value that is indicated in the ARO field is illustrated in FIG. 21.

FIG. 22 is a diagram illustrating another example of the flow for downlink data transmission between the base station 101 and the terminal 102 and for the response procedure for the downlink data transmission. The base station 101 transmits the synchronization signal and/or the system information (Step S2201). The terminal 102 receives the synchronization signal and/or the system information, and acquires $N^{(1)}$ based on the cell identifier and/or the system information that correspond to the synchronization signal (Step S2202). $N^{(1)}$ indicates an amount of common shift that is set to be common to all the terminals. Furthermore, the terminal 102 can acquire the parameter relating to the first EPDCCH-PRB set describe above, based on the cell identifier and/or the system information that correspond to the synchronization signal. Moreover, the system information is normally transmitted and received through the broadcast channel, but even when the system information is notified through the individual signaling (the RRC signaling) that is destined for each terminal 102, the same effect can be obtained. Furthermore, the cell identifier is normally acquired in the terminal 102 based on the synchronization signal, but even when the cell identifier is notified through the individual signaling (the RRC signaling) that is intended for each terminal 102, the same effect can be obtained.

Next, the base station 101 transmits the downlink grant to the terminal 102 and transmits the downlink transmission data corresponding to the downlink grant to the terminal 102, using the EPDCCH that is arranged in the SS within the first set, and the terminal 102 receives the downlink grant and the downlink transmission data (Step S2203). Furthermore, the terminal 102 that receives the downlink transmission data generates the HARQ response information. At this time, the base station 101 transmits the EPDCCH using the parameter relating to the first EPDCCH-PRB set based on the cell identifier and/or the system information that correspond to the synchronization signal, and the terminal 102 receives the EPDCCH using the parameter relating to the first EPDCCH-PRB set based on the cell identifier and/or the system information that correspond to the synchronization signal.

The terminal 102 determines the PUCCH resource based on $N^{(1)}$ that is acquired in Step S2202 and on information on the EPDCCH resource that is detected in Step S2203, and reports the HARQ response information using the determined PUCCH resource (Step S2204).

On the other hand, before transmitting and receiving the EPDCCH in the second set, the base station 101 notifies the terminal 102 of the control information for indicating (configuring or notifying of) $N^{(e1)}_1$ corresponding to the second set, using the individual RRC signaling, and terminal 102 sets $N^{(e1)}_1$ based on the control information (Step S2205). $N^{(e1)}_1$ indicates an amount of individual shift that is configured individually for every terminal 102. Furthermore, in Step S2205, the base station 101 notifies the terminal 102 of the control information for indicating (configuring or notifying of) the parameter relating to the second EPDCCH-PRB set, using the individual RRC signaling, and the terminal 102 can set these parameters based on the control information.

Next, the base station 101 transmits the downlink grant to the terminal 102 and transmits the downlink transmission data corresponding to the downlink grant to the terminal 102, using the EPDCCH that is arranged in the SS within the second set, and the terminal 102 receives the downlink grant and the downlink transmission data (Step S2206). At this time, the terminal 102 acquires the offset value that is indicated by the ARO field within the EPDCCH. Furthermore, the terminal 102 that receives the downlink transmission data generates the HARQ response information. At this time, the base station 101 transmits the EPDCCH using the parameter relating to the second EPDCCH-PRB set that is set using the individual RRC signaling, and the terminal 102 receives the EPDCCH using the parameter relating to the second EPDCCH-PRB set that is set using the individual RRC signaling.

The terminal 102 determines the PUCCH resource based on $N^{(e1)}_1$ that is acquired in Step S2205, the information on the EPDCCH resource that is detected in Step S2206, and the offset value that is acquired in Step S2206, and reports the HARQ response information using the determined PUCCH resource (Step S2207).

As described above, when downlink transmission data relating to the downlink grant in the SS within the first EPDCCH-PRB set is transmitted, considering a prescribed offset, the base station 101 assigns the downlink grant to a resource for the SS within the first EPDCCH-PRB set that corresponds to an uplink control channel resource which is used for reporting the HARQ response information corresponding to the downlink transmission data. Desirably, a prescribed offset is added to an index in an element that has the smallest index, among elements that construct the resource in the SS within the first EPDCCH-PRB set. The PUCCH resource that has an index that is equal to a value that results from the addition is a PUCCH resource that corresponds to the resource for the downlink grant. Furthermore, the base station 101 monitors the uplink control channel resource, and extracts the HARQ response information. Here, the terminal 102 can acquire the prescribed offset before the RRC connection establishment (or before the target cell is set to be the serving cell).

On the other hand, when the downlink transmission data relating to the downlink grant in the SS within the second EPDCCH-PRB set is transmitted, considering an offset that is individually signaled, the base station 101 assigns the downlink grant to a resource for the SS within the second EPDCCH-PRB set that corresponds to an uplink control channel resource which is used for reporting the HARQ response information corresponding to the downlink transmission data. Desirably, a prescribed offset is added to an index in an element that has the smallest index, among elements that construct the resource in the SS within the second EPDCCH-PRB set. The PUCCH resource that has an index that is equal to a value that results from the addition is a PUCCH resource that corresponds to the resource for the downlink grant. Furthermore, the base station 101 monitors the uplink control channel resource, and extracts the HARQ response information. Here, after the RRC connection establishment (or after the target cell is set to be the serving cell), the offset is transmitted and received through dedicated RRC signaling.

Furthermore, in a case where the downlink grant is detected in the SS within the first EPDCCH-PRB set, considering a prescribed offset, the terminal 102 reports the HARQ response information responding to the downlink grant transmission data associated with the downlink grant, using the PUCCH resource corresponding to the EPDCCH resource in which the downlink grant is detected. On the other hand, in a case where the downlink grant is detected in the SS within the second EPDCCH-PRB set, considering the offset that is individually signaled, the terminal 102 reports the HARQ response information responding to the downlink transmission data associated with the downlink grant, using the PUCCH resource corresponding to EPDCCH resource in which the downlink grant is detected.

In other words, the base station 101 arranges the EPDCCH in the SS within the first EPDCCH-PRB set or the SS within the second EPDCCH-PRB set, and notifies the terminal 102 of the result. In a case where the EPDCCH that is arranged in the SS within the first EPDCCH-PRB set and the EPDCCH that is arranged in the SS within the second EPDCCH-PRB set are monitored and the downlink grant is detected, the terminal 102 extracts the transmission data in the PDSCH associated with the detected downlink grant, generates the response information responding to the extracted transmission data, maps the response information to the PUCCH resource that corresponds to the resource in which the downlink grant is detected, generates the PUCCH, and reports the result to the base station 101. Here, when the response information is mapped to the PUCCH resource, depending on whether the EPDCCH is received in the SS within the first EPDCCH-PRB set, or the EPDCCH is received in the SS within the second EPDCCH-PRB set, a corresponding prescribed offset value or an offset value that is individually signaled is accordingly used. The base station 101 extracts the PUCCH to which the response information responding to the transmission data in the PDSCH associated with the downlink grant is mapped, in the PUCCH resource that corresponds to the resource in which the downlink grant is arranged.

Moreover, in other words, in the cell, the base station sends the terminal the Enhanced Physical Downlink Control Channel arranging the Enhanced Physical Downlink Control Channel in a first Enhanced Physical Downlink Control Channel-Physical Resource Block set or a second Enhanced Physical Downlink Control Channel-Physical Resource Block set. The terminal monitors the Enhanced Physical Downlink Control Channel in the first Enhanced Physical Downlink Control Channel-Physical Resource Block set and the second Enhanced Physical Downlink Control Channel-Physical Resource Block set. In a case where the Physical Downlink Control Channel is detected, the terminal extracts the transmission data in the Physical Downlink Shared Channel associated with the detected Physical Downlink Control Channel, and generates the response information responding to the extracted transmission data. In a case where the Physical Downlink Control Channel is detected in the first Enhanced Physical Downlink Control Channel-Physical Resource Block set, the terminal maps the corresponding response information to a Physical Uplink Control Channel resource that is determined in accordance with an index of an element that constructs a Physical Downlink Control Channel resource in which at least the Physical Downlink Control Channel is detected and with a prescribed offset, generates the Physical Uplink Control Channel, and transmits a signal that includes the Physical Uplink Control Channel. In a case where the Physical Downlink Control Channel is detected in the second Enhanced Physical Downlink Control Channel-Physical Resource Block set, the terminal maps the corresponding response information to the Physical Uplink Control Channel resource that is determined in accordance with the index of the element that constructs the Physical Downlink Control Channel resource in which at least the Physical Downlink Control Channel is detected, and with an offset that is individually configured for every terminal, generates the Physical Uplink Control Channel, and transmits the signal that includes the Physical Uplink Control Channel. Moreover, in a case where the Enhanced Physical Downlink Control Channel is notified being arranged in the first Enhanced Physical Downlink Control Channel-Physical Resource Block set, the base station extracts the Physical Uplink Control Channel to which the response information responding to the transmission data in the Physical Downlink Shared Channel associated with the corresponding Physical Downlink Control Channel is mapped, in the Physical Uplink Control Channel resource that is determined in accordance with the index of the element that constructs an Enhanced Physical Downlink Control Channel resource in which at least the Enhanced Physical Downlink Control Channel is arranged, and with the prescribed offset. In a case where the Enhanced Physical Downlink Control Channel is notified being arranged in the second Enhanced Physical Downlink Control Channel-Physical Resource Block set, the base station extracts the Physical Uplink Control Channel to which the response information responding to the transmission data in the Physical Downlink Shared Channel associated with the corresponding Physical Downlink Control Channel is mapped, in the Physical Uplink Control Channel resource that is determined in accordance with the index of the element that constructs the Enhanced Physical Downlink Control Channel resource in which at least the Enhanced Physical Downlink Control Channel is arranged, and with the offset that is individually configured for every terminal.

Accordingly, even in a case where the EPDCCH is transmitted and received being arranged in the SS within the first EPDCCH-PRB set or in the SS within the second EPDCCH-PRB set, an uplink control channel can be dynamically assigned to the terminal. For this reason, it is possible to efficiently use the uplink control channel. Furthermore, because the PUCCH resource that corresponds to the SS within the first EPDCCH-PRB set does not depend on a parameter that is specific to the terminal, the PUCCH resource can be used before the RRC connection establishment (or before the target cell is set to be the serving cell).

Moreover, according to the embodiments described above, the PUCCH resource that is used for transmission is changed depending on whether the terminal detects the EPDCCH in the CSS or detects the EPDCCH in the USS. Furthermore, the PUCCH resource that is received is changed depending on whether the base station transmits the PDCCH or the EPDCCH in a state of being arranged in the first EPDCCH-PRB set or transmits the PDCCH or the EPDCCH in a state of being arranged in the second EPDCCH-PRB set. However, instead of the EPDCCH-PRB set, even if the change is made in accordance with a DCI format, an effect similar to that according to each of the embodiments described above can be obtained. More specifically, the PUCCH resource that is used for transmission is changed depending on whether the terminal detects the DCI format that is transmissible in the SS within the first EPDCCH-PRB set, as the EPDCCH, or detects the DCI format that is transmissible only in the SS within the second EPDCCH-PRB set, as the EPDCCH. Furthermore, the PUCCH resource that is received is changed depending on whether the base station transmits the DCI format that is transmissible in the SS within the first EPDCCH-PRB set, as the EPDCCH or transmits the DCI format that is transmissible only in the SS within the second EPDCCH-PRB set, as the EPDCCH.

Moreover, according to each of the embodiments, the resource element or the resource block is described above as being used as a unit for mapping the data channel, the control channel, the PDSCH, the PDCCH, and the reference signal, and the subframe or the radio frame is described as being used as a unit of transmission in a time direction, but this does not impose any limitation. Even if, instead of these, space and time units are used that are configured from an arbitrary frequency and time, respectively, the same effect can be obtained.

Furthermore, the system information according to the embodiments described above is information that is broadcast using a master information block or a system information block. Normally, these pieces of information are broadcast using the physical broadcast channel or the Physical Downlink Shared Channel that is indicated with the downlink grant for the system information (these channels may be referred to as broadcast channels). However, this does not impose any limitation. In a case where handover is performed between cells, dedicated RRC signaling in a cell that is a handover source is used and thus system information of a cell that is a handover destination can be set to be in the terminal.

Furthermore, according to each of the embodiments, the Enhanced Physical Downlink Control Channel 103 that is arranged in the PDSCH region is described as being referred to as the EPDCCH and being definitely distinguished from the Physical Downlink Control Channel (PDCCH) in the related art, but this does not impose any limitation. Even if the EPDCCH and the PDCCH are referred to as the PDCCH, when different operations are performed in the Enhanced Physical Downlink Control channel that is arranged in the PDSCH region and in the Physical Downlink Control Channel in the related art that is arranged in the PDCCH region, respectively, such different operations are substantially the same as in the embodiments described above in each of which the EPDCCH and the PDCCH are distinguished from each other. Furthermore, any Enhanced Physical Downlink Control Channel 103 that is arranged in the SS within the first EPDCCH-PRB set and the SS within the second EPDCCH-PRB set is referred to as the EPDCCH, but this does not impose any limitation. These may be referred to in a distinguished manner. For example, the Enhanced Physical Downlink Control Channel 103 that is arranged in the SS within the first EPDCCH-PRB set may be referred to as Further-Enhanced PDCCH (FPDCCH), and the Enhanced Physical Downlink Control Channel 103 that is arranged in the SS within the second EPDCCH-PRB set may be referred to as the EPDCCH.

Moreover, when the terminal starts to communicate with the base station, the terminal notifies the base station of information (information on the ability of the terminal, or functional group information) indicating whether or not the function that is described according to each of the embodiments is usable with respect to the base station. Thus, the base station can determine whether or not the function that is described according to each of the embodiments is usable. More specifically, in a case where the function that is described according to each of the embodiments is usable, information to that effect may be included in the information on the ability of the terminal, and in a case where the function that is described according to each of the embodiments is not usable, information relating to that function may not be included in the information on the ability of the terminal. Alternatively, in a case where the function that is described according to each of the embodiments is usable, a value of 1 may be entered into a predetermined bit field for the functional group information, and in a case where the function that is described according to each of the embodiments is not usable, a value of 0 may be entered into the predetermined bit field for the functional group information.

A program running on the base station and the terminal according to the present invention is a program (a program for causing a computer to operate) that controls a CPU and the like in such a manner as to realize the function according to the embodiments of the present invention. Then, pieces of information that are handled in these devices are temporarily stored in a RAM while being processed. Thereafter, the pieces of information are stored in various ROMs or HDDs, and whenever necessary, is read by the CPU to be modified or written. As a recording medium on which to store the program, among a semiconductor medium (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the functions according to the embodiments described above are realized by running the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transmitted to a server computer that is connected through a network such as the Internet. In this case, a storage device of the server computer is also included in the present invention. Furthermore, some or all of the portions of the base station and the terminal according to the embodiments described above may be realized as LSI that is a typical integrated circuit. Each functional block of the base station and the terminal may be individually built into a chip, and some or all functional blocks may be integrated into a chip. Furthermore, a technique of the integrated circuit is not limited to the LSI, and an integrated circuit may be realized with a dedicated circuit or a general-purpose processor. Furthermore, if with advances in a semiconductor technology, a circuit integration technology with which an LSI is replaced appears, it is also possible to use an integrated circuit to which such a technology is applied.

The embodiments of the present invention are described in detail above referring to the drawings, but the specific configuration is not limited to the embodiments and includes an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

INDUSTRIAL APPLICABILITY

The present invention is suitable for use in a wireless base station device, a wireless terminal device, a wireless communication system, or a wireless communication method.

REFERENCE SIGNS LIST

101 BASE STATION
102 TERMINAL
103 ENHANCED PHYSICAL DOWNLINK CONTROL CHANNEL
104 DOWNLNK TRANSMISSION DATA
105 PHYSICAL UPLINK CONTROL CHANNEL
401 CODEWORD GENERATION MODULE
402 DOWNLINK SUBFRAME GENERATION MODULE
403 PHYSICAL DOWNLINK CONTROL CHANNEL GENERATION MODULE
404 OFDM SIGNAL TRANSMISSIN MODULE
405, 511 TRANSMIT ANTENNA
406, 501 RECEIVE ANTENNA
407 SC-FDMA SIGNAL RECEPTION MODULE
408 UPLINK SUBFRAME PROCESSING MODULE

409 PHYSICAL UPLINK CONTROL CHANNEL EXTRACTION MODULE
410, 506 HIGHER LAYER
502 OFDM SIGNAL RECEPTION MODULE
503 DOWNLINK SUBFRAME PROCESSING MODULE
504 PHYSICAL DOWNLINK CONTROL CHANNEL EXTRACTION MODULE
505 CODEWORD EXTRACTION MODULE
507 RESPONSE INFORMATION GENERATION MODULE
508 UPLINK SUBFRAME GENERATION MODULE
509 PHYSICAL UPLINK CONTROL CHANNEL GENERATION MODULE
510 SC-FDMA GENERATION TRANSMISSION MODULE
2301 BASE STATION
2302 TERMINAL
2303 PHYSICAL DOWNLINK CONTROL CHANNEL
2304 DOWNLINK TRANSMISSION DATA
2305 PHYSICAL UPLINK CONTROL CHANNEL

The invention claimed is:

1. User equipment (UE) which communicates with a base station in a cell, the UE comprising:
reception circuitry that receives a cell-specific reference signal, a first demodulation reference signal, and a second demodulation reference signal; and
extract circuitry that monitors a first physical control channel and a second physical control channel, wherein
the first demodulation reference signal and the first physical control channel are transmitted on a same antenna port(s),
the second demodulation reference signal and the second physical control channel are transmitted on a same antenna port(s),
the first physical control channel is a physical control channel which is allocated in common search space,
the second physical control channel is a physical control channel which is allocated in UE-specific search space,
a resource block set for the first physical control channel consists of a pre-determined set of resource blocks included in a given bandwidth,
a resource block set for the second physical control channel consists of a set of resource blocks which are configured via dedicated RRC signaling, and
the first demodulation reference signal is generated using a sequence which is initiated based on a cell identity of the cell.

2. The UE of claim 1, wherein
the first physical control channel is mapped based on the cell-specific reference signal and the first demodulation reference signal, and
the second physical control channel is mapped based on the cell-specific reference signal and the second demodulation reference signal.

3. A base station which communicates with a user equipment (UE) in a cell, the base station comprising:
transmission circuitry that transmits a cell-specific reference signal, a first demodulation reference signal, and a second demodulation reference signal; and
generation circuitry that generates a first physical control channel and a second physical control channel, wherein
the first demodulation reference signal and the first physical control channel are transmitted on a same antenna port(s),
the second demodulation reference signal and the physical control channel are transmitted on a same antenna port(s),
the first physical control channel is a physical control channel which is allocated in common search space,
the second physical control channel is a physical control channel which is allocated in UE-specific search space,
a resource block set for the first physical control channel consists of a pre-determined set of resource blocks included in a given bandwidth, and
a resource block set for the second physical control channel consists of a set of resource blocks which are configured via dedicated RRC signaling, and
the first demodulation reference signal is generated using a sequence which is initiated based on a cell identity of the cell.

4. The base station of claim 3, wherein
the first physical control channel is mapped based on the cell-specific reference signal and the first demodulation reference signal, and
the second physical control channel is mapped based on the cell-specific reference signal and the second demodulation reference signal.

5. A method for a user equipment (UE) which communicates with a base station in a cell, the method comprising:
receiving a cell-specific reference signal;
receiving a first demodulation reference signal;
receiving a second demodulation reference signal;
monitoring a first physical control channel; and
monitoring a second physical control channel, wherein
the first demodulation reference signal and the first physical control channel are transmitted on a same antenna port(s),
the second demodulation reference signal and the second physical control channel are transmitted on a same antenna port(s),
the first physical control channel is a physical control channel which is allocated in common search space,
the second physical control channel is a physical control channel which is allocated in UE-specific search space,
a resource block set for the first physical control channel consists of a pre-determined set of resource blocks included in a given bandwidth, and
a resource block set for the second physical control channel consists of a set of resource blocks which are configured via dedicated RRC signaling, and
the first demodulation reference signal is generated using a sequence which is initiated based on a cell identity of the cell.

6. A method for a base station which communicates with a user equipment (UE) in a cell, the method comprising:
transmitting a cell-specific reference signal;
transmitting a first demodulation reference signal;
transmitting a second demodulation reference signal;
generating a first physical control channel; and
generating a second physical control channel, wherein
the first demodulation reference signal and the first physical control channel are transmitted on a same antenna port(s),
the second demodulation reference signal and the second physical control channel are transmitted on a same antenna port(s),
the first physical control channel is a physical control channel which is allocated in common search space,
the second physical control channel is a physical control channel which is allocated in UE-specific search space, a resource block set for the first physical control channel consists of a pre-determined set of resource blocks included in a given bandwidth, and a resource block set for the second physical control channel consists of a set of resource blocks which are configured via dedicated RRC signaling, and the first demodulation reference signal is generated using a sequence which is initiated based on a cell identity of the cell.

\* \* \* \* \*